United States Patent
Hu et al.

(10) Patent No.: US 11,627,623 B2
(45) Date of Patent: Apr. 11, 2023

(54) CONNECTION RESUME REQUEST METHOD AND APPARATUS

(71) Applicant: Huawei Technologies Co., Ltd., Shenzhen (CN)

(72) Inventors: Li Hu, Shanghai (CN); Bingzhao Li, Beijing (CN); Jing Chen, Shanghai (CN); Tingting Geng, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/874,117

(22) Filed: May 14, 2020

(65) Prior Publication Data
US 2020/0275508 A1 Aug. 27, 2020

Related U.S. Application Data

(63) Continuation of application No. PCT/CN2018/116000, filed on Nov. 16, 2018.

(30) Foreign Application Priority Data

Nov. 16, 2017 (CN) .......................... 201711138495.4
Feb. 13, 2018 (CN) .......................... 201810149050.4

(51) Int. Cl.
*H04W 76/18* (2018.01)
*H04W 76/34* (2018.01)
(Continued)

(52) U.S. Cl.
CPC ........... *H04W 76/18* (2018.02); *H04W 12/04* (2013.01); *H04W 12/10* (2013.01); *H04W 76/34* (2018.02)

(58) Field of Classification Search
CPC ..... H04W 76/18; H04W 76/14; H04W 12/10; H04W 12/04
See application file for complete search history.

(56) References Cited

U.S. PATENT DOCUMENTS

2016/0029275 A1 1/2016 Guo et al.
2017/0202047 A1 7/2017 Tiwari et al.
(Continued)

FOREIGN PATENT DOCUMENTS

CN 101848536 A 9/2010
CN 106961712 A 7/2017
(Continued)

OTHER PUBLICATIONS

Huawei et al., "pCR to TS 33.501: Security Handling at Transition from RRC-INACTIVE to RRC-CONNECTED transition", 3GPP TSG SA WG3 (Security) Meeting #88Bis Adhoc S3-172261, Oct. 9-13, 2017, Singapore, 2 pages.
(Continued)

*Primary Examiner* — Muthuswamy G Manoharan
(74) *Attorney, Agent, or Firm* — Conley Rose, P.C.

(57) ABSTRACT

A connection resume request method includes generating, by a terminal, a new access stratum key; sending, by the terminal to a target base station, a connection resume request message requesting to resume a radio resource control (RRC) connection; receiving, by the terminal, a connection resume rejection message from the target base station, wherein the connection resume rejection message indicates that the resuming of the RRC connection is rejected; and resuming, by the terminal, the new access stratum key to a previous access stratum key, wherein the previous access stratum key is an access stratum key that is used, before the apparatus enters an inactive state, by the terminal and the source base station.

24 Claims, 8 Drawing Sheets

(51) Int. Cl.
*H04W 12/04* (2021.01)
*H04W 12/10* (2021.01)

(56) References Cited

U.S. PATENT DOCUMENTS

| | | | |
|---|---|---|---|
| 2017/0202050 A1 | 7/2017 | Deng | |
| 2019/0045570 A1 | 2/2019 | Lu et al. | |
| 2019/0124506 A1* | 4/2019 | Tenny | H04W 12/0431 |
| 2019/0124711 A1 | 4/2019 | Dai | |
| 2019/0174571 A1* | 6/2019 | Deenoo | H04W 76/11 |
| 2019/0191483 A1* | 6/2019 | Ryoo | H04W 76/10 |
| 2020/0221524 A1* | 7/2020 | Jiang | H04W 76/19 |

FOREIGN PATENT DOCUMENTS

| | | |
|---|---|---|
| CN | 107046735 A | 8/2017 |
| CN | 107294723 A | 10/2017 |
| CN | 107318176 A | 11/2017 |
| RU | 2015147167 A | 5/2017 |
| TW | 201725928 A | 7/2017 |
| WO | 2017048170 A1 | 3/2017 |

OTHER PUBLICATIONS

3GPP TS 33.401 V15.1.0 "3rd Generation Partnership Project; Technical Specification Group Services and System Aspects;3GPP System Architecture Evolution (SAE);Security architecture(Release 15)";Sep. 2017, 161 pages.

3GPP TS 33.501 V0.4.0 "3rd Generation Partnership Project; Technical Specification Group Services and System Aspects;Security Architecture and Procedures for 5G System (Release 15)"; Oct. 2017, 70 pages.

3GPP TS 36.331 V14.4.0 "3rd Generation Partnership Project; Technical Specification Group Radio Access Network Evolved Universal Terrestrial Radio Access (E-UTRA);Radio Resource Control (RRC); Protocol specification Release 14)"; Sep. 2017, 753 pages.

3GPP TS 38.331 V0.1.0 "3rd Generation Partnership Project; Technical Specification Group Radio Access Network NR;Radio Resource Control (RRC);Protocol specification(Release 15 );" Oct. 2017, 42 pages.

Ericsson, "Security solution for key handling in state transition from RRC inactive state to RRC connected state," 3GPP TSG SA WG3 (Security) Meeting#87 S3-171587, May 15-19, 2017, Ljubljana, Slovenia, 3 pages.

Ericsson, "Security solution for key handling in state transition from RRC inactive state to RRC connected state," 3GPP TSG SA WG3 (Security) Meeting #87, May 15-19, 2017, Ljubljana, Slovenia, S3-171149, 3 pages.

Ericsson, "Security for RRC Connection Suspend and Resume procedure in solution 18 for Narrow Band CIoT," 3GPP TSG-SA WG3 Meeting #82 , Dubrovnik, Croatia, Feb. 1-5, 2016, S3-160157, 7 pages.

* cited by examiner

CONNECTION RESUME REQUEST METHOD AND APPARATUS

CROSS-REFERENCE TO RELATED APPLICATIONS

This application is a continuation of International Patent Application No. PCT/CN2018/116000, filed on Nov. 16, 2018, which claims priority to Chinese Patent Application No. 201810149050.4, filed on Feb. 13, 2018 and Chinese Patent Application No. 201711138495.4, filed on Nov. 16, 2017. All of the aforementioned patent applications are hereby incorporated by reference in their entireties.

TECHNICAL FIELD

This application relates to the field of mobile communications technologies, and in particular, to a connection resume request method and an apparatus.

BACKGROUND

In long term evolution (LTE), a suspend and resume procedure may be applied to a narrowband internet of things (NB-IoT) terminal, namely, an internet of things device with relatively low mobility or low power consumption, such as a smart water meter.

When a base station instructs, in a suspend manner, the terminal to release a current connection, the terminal and the base station delete a part of access stratus contexts, and further retain a part of the access stratus contexts, such as an access stratum key, a security capability of the terminal, and a currently selected security algorithm. Then, the terminal enters an inactive state from a connected state. When the terminal expects to resume the connection to the base station, the terminal may quickly resume from the inactive state to the connected state.

In a 5th generation (5G) system and a future communications system, the foregoing service procedure may be extended, and the suspend and resume procedure is applied to an enhanced mobile broadband (eMBB) terminal such as a smartphone.

Because mobility of the terminal is relatively high, a base station accessed by the terminal may change. Further, when serving the terminal, the base station considers a load balancing scenario. For example, when the terminal requests to resume from the inactive state to the connected state, if load of a base station that the terminal currently intends to access is relatively heavy, the base station rejects access by the terminal, that is, rejects a connection resume request of the terminal, and indicates the terminal to try to resume the connection after resting for a period of time.

In the foregoing scenario, after the connection resume request of the terminal is rejected firstly, authentication information sent by the terminal may be obtained by an attacker, and then the attacker requests, by using the obtained authentication information, the base station to establish a connection. Further, an attack may be caused.

Therefore, in the foregoing scenario, how to effectively defend against an attack of the attacker is a problem that urgently needs to be resolved.

SUMMARY

This application provides a connection resume request method and an apparatus, to effectively defend against an attack of an attacker.

According to a first aspect, this application provides a connection resume request method, including, generating, by a terminal, a message authentication code based on a freshness parameter and an integrity protection key that is of the terminal, where freshness parameters used to generate message authentication codes at two consecutive times are different; and sending, by the terminal, a connection resume request message to a target base station, where the connection resume request message includes the message authentication code, and the connection resume request message is used to request to resume a radio resource control RRC connection.

A message authentication code generated by the terminal each time is different from a message authentication code generated at a previous time. Therefore, even if an attacker steals the message authentication code that is used by the terminal at the previous time, the attacker cannot succeed in the attack because the "expired" message authentication code is used.

In a possible implementation, the freshness parameter includes a quantity of rejection times, and the quantity of rejection times is used to indicate a quantity of times for which resuming of the RRC connection that the terminal attempts to perform is rejected. In a possible implementation, the connection resume request message further includes an indication parameter, and the indication parameter is used to indicate the freshness parameter.

In an example, the freshness parameter includes a Packet Data Convergence Protocol (PDCP) count, and the indication parameter includes some or all bits of the PDCP count.

In a possible implementation, the terminal receives a connection resume response message from the target base station, where the connection resume response message is used to instruct the terminal to resume the RRC connection.

According to a second aspect, this application provides a connection resume request method, including receiving, by a target base station, a connection resume request message from a terminal, where the connection resume request message includes a message authentication code, the connection resume request message is used to request to resume a radio resource control RRC connection, and the message authentication code is generated based on an integrity protection key of the terminal; and sending, by the target base station, a notification message to a source base station if rejecting resuming of the RRC connection, where the notification message includes the message authentication code.

The notification message has one or more of the following functions, the notification message is used to instruct to update a context of the terminal in the source base station; the notification message is used to notify that the target base station rejects resuming of the connection that is performed by the terminal; the notification message is used to instruct to update a freshness parameter in the context of the terminal in the source base station; and the notification message is used to instruct to update a key in the context of the terminal in the source base station.

According to the foregoing method, when rejecting resuming of the RRC connection, the target base station further instructs the source base station to update the context of the terminal, so that context consistency can be maintained between the terminal and the source base station. This helps reduce a failure probability of entering a connected state by the terminal from an inactive state.

In a possible implementation, the context of the terminal that the notification message instructs to update includes an access stratum key.

In a possible implementation, the freshness parameter includes a quantity of rejection times, and the quantity of rejection times is used to indicate a quantity of times for which resuming of the RRC connection that the terminal attempts to perform is rejected.

In a possible implementation, the message authentication code is generated based on the freshness parameter and the integrity protection key that is of the terminal, and the context of the terminal that the notification message instructs to update includes the freshness parameter, where freshness parameters used to generate message authentication codes at two consecutive times are different.

In this implementation, the connection resume request message further includes an indication parameter, the indication parameter is used to indicate the freshness parameter, and the notification message further includes the indication parameter. In an example, the freshness parameter includes a PDCP count, and the indication parameter includes some or all bits of the PDCP count.

According to a third aspect, this application provides a connection resume request method, including receiving, by a target base station, a connection resume request message from a terminal, where the connection resume request message includes a message authentication code; the message authentication code is generated based on a freshness parameter and an integrity protection key that is of the terminal, where freshness parameters used to generate message authentication codes at two consecutive times are different; and the connection resume request message is used to request to resume a radio resource control RRC connection; and sending, by the target base station, a context request message to a source base station if accepting the resuming of the RRC connection, where the context request message includes the message authentication code, and the context request message is used to request to obtain a context of the terminal.

In a possible implementation, the freshness parameter includes a quantity of rejection times, and the quantity of rejection times is used to indicate a quantity of times for which resuming of the RRC connection that the terminal attempts to perform is rejected.

In a possible implementation, the connection resume request message further includes an indication parameter, the indication parameter is used to indicate the freshness parameter, and the context request message further includes the indication parameter.

In an example, the freshness parameter includes a PDCP count, and the indication parameter includes some or all bits of the PDCP count.

According to a fourth aspect, this application provides a connection resume request method, including receiving, by a source base station, a notification message from a target base station, where the notification message includes a message authentication code, and the message authentication code is generated based on an integrity protection key of a terminal; checking, by the source base station, the message authentication code based on an integrity protection key of the source base station; and updating, by the source base station, a context of the terminal in the source base station if checking the message authentication code to be successful.

According to the foregoing method, when rejecting resuming of an RRC connection, the target base station further instructs the source base station to update the context of the terminal, so that the source base station updates the context of the terminal. Therefore, context consistency can be maintained between the source base station and the terminal. This helps reduce a failure probability of entering a connected state by the terminal from an inactive state.

The notification message has one or more of the following functions, the notification message is used to instruct to update the context of the terminal in the source base station; the notification message is used to notify that the target base station rejects resuming of the connection that is performed by the terminal; the notification message is used to instruct to update a freshness parameter in the context of the terminal in the source base station; and the notification message is used to instruct to update a key in the context of the terminal in the source base station.

In a possible implementation, the freshness parameter includes a quantity of rejection times, and the quantity of rejection times is used to indicate a quantity of times for which resuming of the RRC connection that the terminal attempts to perform is rejected.

In an example, the updating, by the source base station, a context of the terminal in the source base station includes increasing, by the source base station, the quantity of rejection times in the context of the terminal by 1.

In a possible implementation, the updating, by the source base station, a context of the terminal in the source base station includes updating, by the source base station, an access stratum key in the context of the terminal.

In a possible implementation, the message authentication code is generated based on the freshness parameter and the integrity protection key that is of the terminal, where freshness parameters used to generate message authentication codes at two consecutive times are different; and the checking, by the source base station, the message authentication code based on an integrity protection key of the source base station includes checking, by the source base station, the message authentication code based on the freshness parameter and the integrity protection key that is of the source base station.

In a possible implementation, the notification message further includes an indication parameter, and the indication parameter is used to indicate the freshness parameter.

In an example, the freshness parameter includes a PDCP count, and the updating, by the source base station, a context of the terminal in the source base station includes updating, by the source base station if a value of the PDCP count is greater than a value of a PDCP count in the context of the terminal, the value of the PDCP count in the context of the terminal to the value of the PDCP count indicated by the indication parameter.

According to a fifth aspect, this application provides a connection resume request method, including receiving, by a source base station, a context request message from a target base station, where the context request message includes a message authentication code; the message authentication code is generated based on a freshness parameter and an integrity protection key that is of a terminal, where freshness parameters used to generate message authentication codes at two consecutive times are different; and the context request message is used to request to obtain a context of the terminal; checking, by the source base station, the message authentication code based on the freshness parameter and an integrity protection key that is of the source base station; and updating, by the source base station, the freshness parameter in the context of the terminal if checking the message authentication code to be successful, and sending a context response message to the target base station, where the context response message includes the context of the terminal.

In a possible implementation, the freshness parameter includes a quantity of rejection times, and the quantity of rejection times is used to indicate a quantity of times for which resuming of the RRC connection that the terminal attempts to perform is rejected; and updating, by the source base station, the context of the terminal in the source base station includes resetting, by the source base station, the quantity of rejection times in the context of the terminal to zero.

In a possible implementation, the context request message further includes an indication parameter, the indication parameter is used to indicate the freshness parameter, and the freshness parameter includes a PDCP count; and the updating, by the source base station, the context of the terminal in the source base station includes updating, by the source base station if a value of the PDCP count is greater than a value of a PDCP count in the context of the terminal, the value of the PDCP count in the context of the terminal to the value of the PDCP count indicated by the indication parameter.

In an example, the indication parameter includes some bits of the PDCP count; and the source base station determines, based on the indication parameter, the PDCP count indicated by the indication parameter.

According to a sixth aspect, this application provides an apparatus. The apparatus may be a terminal, or may be a chip in a terminal. The apparatus has a function of implementing each embodiment of the first aspect. The function may be implemented by hardware, or may be implemented by hardware by executing corresponding software. The hardware or the software includes one or more modules corresponding to the foregoing functions.

In a possible design, when the apparatus is the terminal, the terminal includes a sending unit and a processing unit, and optionally further includes a receiving unit. The processing unit may be, for example, a processor, the receiving unit may be, for example, a receiver, and the sending unit may be, for example, a transmitter. The receiver and the transmitter include a radio frequency circuit. Optionally, the terminal further includes a storage unit, and the storage unit may be, for example, a memory. When the terminal includes the storage unit, the storage unit stores a computer executable instruction, the processing unit is connected to the storage unit, and the processing unit executes the computer executable instruction stored in the storage unit, to enable the terminal to perform the connection resume request method according to any implementation of the first aspect.

In another possible design, when the apparatus is the chip in the terminal, the chip includes a sending unit and a processing unit, and optionally further includes a receiving unit. The processing unit may be, for example, a processing circuit, the receiving unit may be, for example, an input interface, a pin, a circuit, or the like, and the sending unit may be, for example, an output interface, a pin, a circuit, or the like. The processing unit may execute the computer executable instruction stored in the storage unit, so that the connection resume request method according to any implementation of the first aspect is performed. Optionally, the storage unit may be a storage unit in the chip, such as a register or a cache. Alternatively, the storage unit may be a storage unit that is in the terminal and that is located outside the chip, such as a read-only memory (ROM), another type of static storage device that can store static information and an instruction, or a random access memory (RAM).

The processor mentioned anywhere above may be a general-purpose central processing unit (CPU), a microprocessor, an application-specific integrated circuit (ASIC), or one or more integrated circuits configured to control program execution of the connection resume request method according to any implementation of the first aspect.

According to a seventh aspect, this application provides an apparatus. The apparatus may be a target base station, or may be a chip in a target base station. The apparatus has a function of implementing each embodiment of the second aspect. The function may be implemented by hardware, or may be implemented by hardware by executing corresponding software. The hardware or the software includes one or more modules corresponding to the foregoing functions.

In a possible design, when the apparatus is the target base station, the base station includes a receiving unit and a sending unit, and optionally further includes a processing unit. The processing unit may be, for example, a processor, the receiving unit may be, for example, a receiver, and the sending unit may be, for example, a transmitter. The receiver and the transmitter include a radio frequency circuit. Optionally, the base station further includes a storage unit, and the storage unit may be, for example, a memory. When the base station includes the storage unit, the storage unit stores a computer executable instruction, the processing unit is connected to the storage unit, and the processing unit executes the computer executable instruction stored in the storage unit, to enable the base station to perform the connection resume request method according to any implementation of the second aspect.

In another possible design, when the apparatus is the chip in the target base station, the chip includes a receiving unit and a sending unit, and optionally further includes a processing unit. The processing unit may be, for example, a processing circuit, the receiving unit may be, for example, an input interface, a pin, a circuit, or the like, and the sending unit may be, for example, an output interface, a pin, a circuit, or the like. The processing unit may execute the computer executable instruction stored in the storage unit, so that the connection resume request method according to any implementation of the second aspect is performed. Optionally, the storage unit may be a storage unit in the chip, such as a register or a cache. Alternatively, the storage unit may be a storage unit that is in the target base station and that is located outside the chip, such as a ROM, another type of static storage device that can store static information and an instruction, or a RAM.

The processor mentioned anywhere above may be a general-purpose CPU, a microprocessor, an ASIC, or one or more integrated circuits configured to control program execution of the connection resume request method according to any implementation of the second aspect.

According to an eighth aspect, this application provides an apparatus. The apparatus may be a target base station, or may be a chip in a target base station. The apparatus has a function of implementing each embodiment of the third aspect. The function may be implemented by hardware, or may be implemented by hardware by executing corresponding software. The hardware or the software includes one or more modules corresponding to the foregoing functions.

In a possible design, when the apparatus is the target base station, the base station includes a receiving unit and a sending unit, and optionally further includes a processing unit. The processing unit may be, for example, a processor, the receiving unit may be, for example, a receiver, and the sending unit may be, for example, a transmitter. The receiver and the transmitter include a radio frequency circuit. Optionally, the base station further includes a storage unit, and the storage unit may be, for example, a memory. When the base station includes the storage unit, the storage unit stores a computer executable instruction, the processing unit is connected to the storage unit, and the processing unit executes the computer executable instruction stored in the storage unit, to enable the base station to perform the connection resume request method according to any implementation of the third aspect.

In another possible design, when the apparatus is the chip in the target base station, the chip includes a receiving unit and a sending unit, and optionally further includes a processing unit. The processing unit may be, for example, a processing circuit, the receiving unit may be, for example, an input interface, a pin, a circuit, or the like, and the sending unit may be, for example, an output interface, a pin, a circuit, or the like. The processing unit may execute the computer executable instruction stored in the storage unit, so that the connection resume request method according to any implementation of the third aspect is performed. Optionally, the storage unit may be a storage unit in the chip, such as a register or a cache. Alternatively, the storage unit may be a storage unit that is in the target base station and that is located outside the chip, such as a ROM, another type of static storage device that can store static information and an instruction, or a RAM.

The processor mentioned anywhere above may be a general-purpose CPU, a microprocessor, an ASIC, or one or more integrated circuits configured to control program execution of the connection resume request method according to any implementation of the third aspect.

According to a ninth aspect, this application provides an apparatus. The apparatus may be a source base station, or may be a chip in a source base station. The apparatus has a function of implementing each embodiment of the fourth aspect. The function may be implemented by hardware, or may be implemented by hardware by executing corresponding software. The hardware or the software includes one or more modules corresponding to the foregoing functions.

In a possible design, when the apparatus is the source base station, the base station includes a receiving unit and a sending unit, and optionally further includes a processing unit. The processing unit may be, for example, a processor, the receiving unit may be, for example, a receiver, and the sending unit may be, for example, a transmitter. The receiver and the transmitter include a radio frequency circuit. Optionally, the base station further includes a storage unit, and the storage unit may be, for example, a memory. When the base station includes the storage unit, the storage unit stores a computer executable instruction, the processing unit is connected to the storage unit, and the processing unit executes the computer executable instruction stored in the storage unit, to enable the base station to perform the connection resume request method according to any implementation of the fourth aspect.

In another possible design, when the apparatus is the chip in the source base station, the chip includes a receiving unit and a sending unit, and optionally further includes a processing unit. The processing unit may be, for example, a processing circuit, the receiving unit may be, for example, an input interface, a pin, a circuit, or the like, and the sending unit may be, for example, an output interface, a pin, a circuit, or the like. The processing unit may execute the computer executable instruction stored in the storage unit, so that the connection resume request method according to any implementation of the fourth aspect is performed. Optionally, the storage unit may be a storage unit in the chip, such as a register or a cache. Alternatively, the storage unit may be a storage unit that is in the source base station and that is located outside the chip, such as a ROM, another type of static storage device that can store static information and an instruction, or a RAM.

The processor mentioned anywhere above may be a general-purpose CPU, a microprocessor, an ASIC, or one or more integrated circuits configured to control program execution of the connection resume request method according to any implementation of the fourth aspect.

According to a tenth aspect, this application provides an apparatus. The apparatus may be a source base station, or may be a chip in a source base station. The apparatus has a function of implementing each embodiment of the fifth aspect. The function may be implemented by hardware, or may be implemented by hardware by executing corresponding software. The hardware or the software includes one or more modules corresponding to the foregoing functions.

In a possible design, when the apparatus is the source base station, the base station includes a receiving unit and a sending unit, and optionally further includes a processing unit. The processing unit may be, for example, a processor, the receiving unit may be, for example, a receiver, and the sending unit may be, for example, a transmitter. The receiver and the transmitter include a radio frequency circuit. Optionally, the base station further includes a storage unit, and the storage unit may be, for example, a memory. When the base station includes the storage unit, the storage unit stores a computer executable instruction, the processing unit is connected to the storage unit, and the processing unit executes the computer executable instruction stored in the storage unit, to enable the base station to perform the connection resume request method according to any implementation of the fifth aspect.

In another possible design, when the apparatus is the chip in the source base station, the chip includes a receiving unit and a sending unit, and optionally further includes a processing unit. The processing unit may be, for example, a processing circuit, the receiving unit may be, for example, an input interface, a pin, a circuit, or the like, and the sending unit may be, for example, an output interface, a pin, a circuit, or the like. The processing unit may execute the computer executable instruction stored in the storage unit, so that the connection resume request method according to any implementation of the fifth aspect is performed. Optionally, the storage unit may be a storage unit in the chip, such as a register or a cache. Alternatively, the storage unit may be a storage unit that is in the source base station and that is located outside the chip, such as a ROM, another type of static storage device that can store static information and an instruction, or a RAM.

The processor mentioned anywhere above may be a general-purpose CPU, a microprocessor, an ASIC, or one or more integrated circuits configured to control program execution of the connection resume request method according to any implementation of the fifth aspect.

According to an eleventh aspect, this application further provides a computer-readable storage medium, the computer-readable storage medium stores an instruction, and when the instruction is run on a computer, the computer is enabled to perform the methods according to the foregoing aspects.

According to a twelfth aspect, this application further provides a computer program product that includes an instruction, and when the computer program product runs on a computer, the computer is enabled to perform the methods according to the foregoing aspects.

According to a thirteenth aspect, this application provides a communications system, the system includes the apparatus according to the sixth aspect, the apparatus according to the seventh aspect, and the apparatus according to the ninth aspect, or the system includes the apparatus according to the sixth aspect, the apparatus according to the seventh aspect, and the apparatus according to the tenth aspect, or the system includes the apparatus according to the sixth aspect, the apparatus according to the eighth aspect, and the apparatus according to the ninth aspect, or the system includes the apparatus according to the sixth aspect, the apparatus according to the eighth aspect, and the apparatus according to the tenth aspect.

According to a fourteenth aspect, this application further provides a connection resume request method, including updating, by a terminal, an access stratum key, to obtain an updated access stratum key; generating, by the terminal, an updated integrity protection key based on the updated access stratum key; generating, by the terminal, a message authentication code based on the updated integrity protection key; sending, by the terminal, a connection resume request message to a target base station, where the connection resume request message includes the message authentication code, and the connection resume request message is used to request to resume a radio resource control RRC connection; receiving, by the terminal, a connection resume rejection message from the target base station, where the connection resume rejection message is used to indicate that resuming of the RRC connection that is performed by the terminal is rejected; and resuming, by the terminal, the access stratum key of the terminal to the access stratum key before the update.

Because in the scenario in which the target base station rejects the connection resume request of the terminal, the terminal already updates the access stratum key, to maintain key consistency between the terminal and the source base station, the terminal may alternatively roll back the key to resume the updated access stratum key of the terminal to the access stratum key before the update. Therefore, an objective that key consistency is always maintained between the terminal and the source base station can also be achieved, and further a problem that the terminal cannot resume a connection due to key asynchronization between the terminal and the source base station can be effectively resolved.

According to a fifteenth aspect, this application provides an apparatus. The apparatus may be a terminal, or may be a chip in a terminal. The apparatus has a function of implementing the embodiment of the fourteenth aspect. The function may be implemented by hardware, or may be implemented by hardware by executing corresponding software. The hardware or the software includes one or more modules corresponding to the foregoing functions.

In a possible design, when the apparatus is the terminal, the terminal includes a sending unit, a receiving unit, and a processing unit. The processing unit may be, for example, a processor, the receiving unit may be, for example, a receiver, and the sending unit may be, for example, a transmitter. The receiver and the transmitter include a radio frequency circuit. Optionally, the terminal further includes a storage unit, and the storage unit may be, for example, a memory. When the terminal includes the storage unit, the storage unit stores a computer executable instruction, the processing unit is connected to the storage unit, and the processing unit executes the computer executable instruction stored in the storage unit, to enable the terminal to perform the connection resume request method according to the fourteenth aspect.

In another possible design, when the apparatus is the chip in the terminal, the chip includes a sending unit, a receiving unit, and a processing unit. The processing unit may be, for example, a processing circuit, the receiving unit may be, for example, an input interface, a pin, a circuit, or the like, and the sending unit may be, for example, an output interface, a pin, a circuit, or the like. The processing unit may execute the computer executable instruction stored in the storage unit, so that the connection resume request method according to the fourteenth aspect is performed. Optionally, the storage unit may be a storage unit in the chip, such as a register or a cache. Alternatively, the storage unit may be a storage unit that is in the terminal and that is located outside the chip, such as a ROM, another type of static storage device that can store static information and an instruction, or a RAM.

The processor mentioned anywhere above may be a general-purpose CPU, a microprocessor, an ASIC, or one or more integrated circuits configured to control program execution of the connection resume request method according to the fourteenth aspect.

These aspects or other aspects of this application are clearer and comprehensible in descriptions of the following embodiments.

DESCRIPTION OF EMBODIMENTS

The following further describes in detail this application with reference to the accompanying drawings. An operation method in method embodiments may also be applied to an apparatus embodiment or a system embodiment. In the descriptions of this application, unless otherwise stated, "a plurality" means two or more than two.

It should be noted that the connection resume request method in this application may be performed by an apparatus. The apparatus may include an apparatus on a network side and/or an apparatus on a terminal side. On the network side, the apparatus may be a base station or a chip in the base station, in other words, the connection resume request method in this application may be performed by the base station or the chip in the base station. On the terminal side, the apparatus may be a terminal or a chip in the terminal, in other words, the connection resume request method in this application may be performed by the terminal or the chip in the terminal.

For ease of description, in this application, an example in which the apparatus is a base station or a terminal is used to describe the connection resume request method. For an implementation method in which the apparatus is a chip in the base station or a chip in the terminal, refer to specific descriptions of the connection resume request method of the base station or the terminal. Details are not described.

Figure 1:
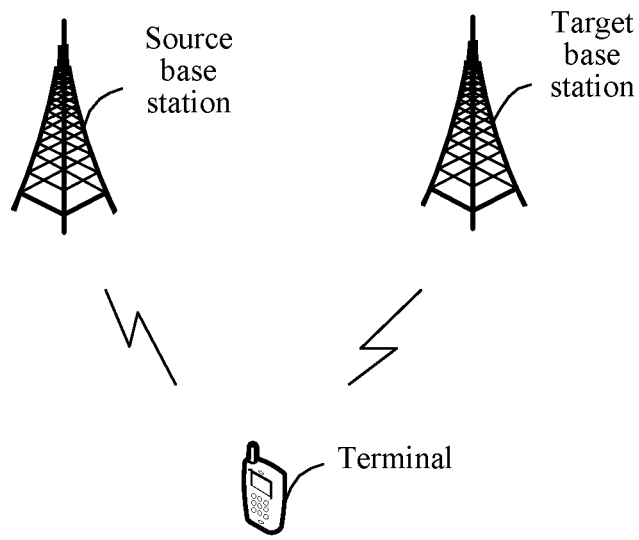
FIG. 1 is a schematic diagram of a possible network architecture according to this application.

FIG. 1 is a schematic diagram of a possible network architecture according to this application. The network architecture includes a terminal, a source base station, and a target base station. The terminal communicates with the source base station and the target base station by using a wireless interface. The source base station and the target base station may communicate with each other by using a wired connection, for example, communicate with each other by using an X2 interface or an Xn interface, or may communicate with each other by using an air interface.

In this application, due to reasons such as movement of the terminal, the terminal may move from the source base station to the target base station. The source base station is a base station that the terminal first accesses, and the target base station is a base station that the terminal latterly accesses after moving.

The terminal is a device having a wireless transceiver function, may be deployed on land, and includes an indoor device, an outdoor device, a handheld device, or a vehicle-mounted device. The terminal may alternatively be deployed on a water surface (for example, on a ship). The terminal may alternatively be deployed in the air (for example, on an aircraft, a balloon, and a satellite). The terminal may be a mobile phone, a tablet, a computer having a wireless transceiver function, a virtual reality (VR) terminal, an augmented reality (AR) terminal, a wireless terminal in industrial control, a wireless terminal in unmanned driving (self driving), a wireless terminal in remote medical, a wireless terminal in smart grid, a wireless terminal in transportation safety, a wireless terminal in smart city, a wireless terminal in smart home, or the like.

A base station is a device that provides a wireless communication function for a terminal, and includes but is not limited to a next generation base station (gNB) in 5G, an evolved NodeB (eNB), a radio network controller (RNC), a NodeB (NB), a base station controller (BSC), a base transceiver station (BTS), a home base station (for example, a home evolved nodeB or a home node B, HNB), a baseband unit (BBU), a transmission point (TRP), a transmitting point (TP), a mobile switching center, and the like.

In this application, a terminal generally has three states, namely, a connected state, an idle state, and an inactive state.

When the terminal is in the connected state, the terminal is in a normal working state. User data may be sent and received between a network side and the terminal.

When the terminal enters the idle state from the connected state, the terminal and the base station generally delete all access stratum (AS) contexts of the terminal. In a special case, in 4G, when the network side releases a connection of the terminal due to a suspend reason, the terminal also enters the idle state from the connected state. However, in this case, the terminal and the base station delete a part of AS contexts, and retain a part of the AS contexts, for example, may retain an access stratum key (which may be referred to as a KeNB in 4G), a security capability of the terminal, and a security algorithm (including an integrity protection algorithm and an encryption algorithm) for communication between the terminal and a source base station accessed by the terminal. The security capability of the terminal refers to a security algorithm supported by the terminal, including a supported encryption algorithm and a supported integrity protection algorithm. In this case, a special idle state in which the terminal is located may be referred to as a suspend state.

In 5G, an inactive state is introduced. When the terminal enters the inactive state from the connected state, the base station suspends the terminal. In this case, the terminal and the base station delete a part of AS contexts, and retain a part of the AS contexts, for example, may retain an access stratum key (which may be referred to as KgNB in 5G), a security capability of the terminal, and a security algorithm (including an integrity protection algorithm and an encryption algorithm) for communication between the terminal and a source base station accessed by the terminal. The security capability of the terminal refers to a security algorithm supported by the terminal, including a supported encryption algorithm and a supported integrity protection algorithm.

For ease of description, the suspend state defined in 4G and the inactive state defined in 5G are collectively referred to as an inactive state subsequently. When the terminal is in the inactive state, both the terminal and the base station accessed by the terminal before the terminal enters the inactive state store a part of AS contexts. For specific content, refer to the foregoing description.

When the terminal is in the inactive state, because a part of AS contexts are retained on the terminal, the terminal enters the connected state from the inactive state more quickly than the terminal enters the connected state from the idle state.

In addition, considering mobility of the terminal, when the terminal is resumed from the inactive state to the connected state, the terminal may need to change a base station. For example, the terminal first establishes a connection to the source base station, and then enters the inactive state in the source base station due to some reasons, for example, a network side notification. When the terminal expects to resume to the connected state, if the terminal has moved to coverage of the target base station, the terminal is resumed from the inactive state to the connected state in the target base station.

Certainly, this application is also applicable to a scenario in which a target base station accessed by the terminal is the same as a source base station when the terminal is resumed from the inactive state to the connected state. In other words, the base station accessed by the terminal may alternatively not change, and is still the same base station.

The following describes a process in which the terminal enters the inactive state from the connected state.

Figure 2:
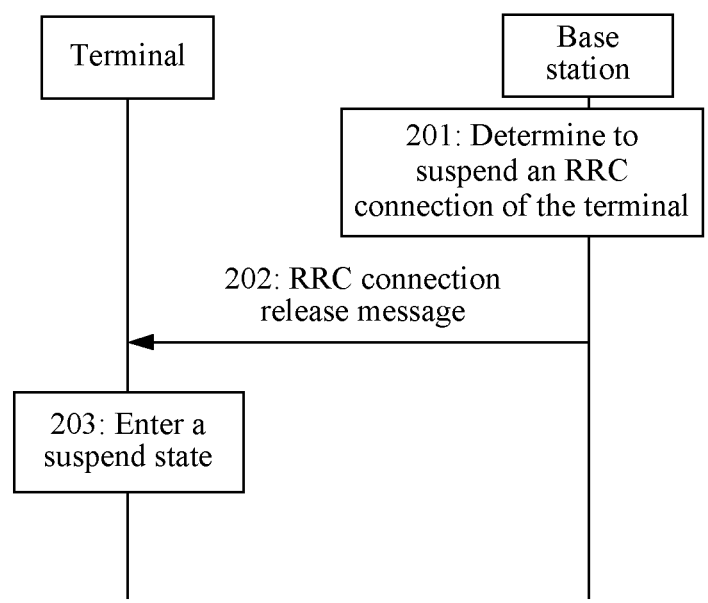
FIG. 2 is a schematic diagram of a process of entering an inactive state from a connected state by a terminal according to this application.

FIG. 2 is a schematic diagram of a process of entering an inactive state from a connected state by a terminal according to this application, including the following steps.

Step 201. A base station determines to suspend a radio resource control (RRC) connection of a terminal.

For example, when the base station does not receive, within a period of time, data sent by the terminal, the base station determines to suspend the terminal.

Step 202. The base station sends a suspend message to the terminal.

The suspend message is used to instruct the terminal to release the RRC connection and enter the inactive state. The suspend message may be, for example, an RRC connection release message having a special indication.

During implementation, the suspend message may carry the following parameter, a resume identifier. Optionally, the suspend message may further carry a next hop chaining counter (NCC) and the like.

The resume identifier is a required parameter when the terminal subsequently enters the connected state from the inactive state. The resume identifier may include information such as an identifier of the source base station and an identifier of the terminal. For example, the resume identifier may be a resume ID, or an inactive-cell radio network temporary identifier (I-RNTI).

The NCC is an optional parameter, and the NCC may also be a required parameter when the terminal subsequently enters the connected state from the inactive state. If the suspend message carries the NCC, an access stratum key subsequently used by the terminal and the base station should be updated. The NCC is a parameter required for generating a new access stratum key. In other words, the NCC may be used to generate a new access stratum key (in this application, KgNB* is used to represent the new access stratum key). If the suspend message does not carry the NCC, an access stratum key subsequently used by the terminal and the base station should not be updated, that is, always remains unchanged.

Optionally, the suspend message may further carry a cause parameter releaseCause, and releaseCause is used to instruct the terminal to perform a suspend operation and enter the inactive state. For example, releaseCause may be set to "RRC Suspend" or "RRC Inactive". When the terminal obtains the releaseCause parameter, and determines that a value of releaseCause is "RRC Suspend" or "RRC Inactive", the terminal performs a related operation of suspending the terminal.

Optionally, the base station may further instruct a control plane network element in a core network to release a bearer, for example, release a signaling radio bearer (SRB) or a data radio bearer (DRB).

Step 203. The terminal enters the inactive state.

The terminal deletes a part of AS contexts, and retains a part of the AS contexts. The retained part of AS contexts include an access stratum key, a security capability of the terminal, an integrity protection algorithm and an encryption algorithm for communication between the terminal and the source base station accessed by the terminal, and the like.

The terminal further stores the resume identifier sent by the base station. Optionally, the terminal further stores a parameter such as the NCC.

The terminal suspends a bearer, for example, suspends a signaling radio bearer or a data radio bearer, and then enters the inactive state.

It can be learned from the foregoing process in which the terminal enters the inactive state from the connected state that after the terminal enters the inactive state, the terminal stores the part of AS contexts and parameters received from the base station. Therefore, when the terminal subsequently expects to resume from the inactive state to the connected state, these parameters help the terminal quickly resume from the inactive state to the connected state.

It should be noted that the base station accessed by the terminal may also be referred to as a source base station accessed by the terminal. When the terminal requests to resume a connection, a base station that the terminal requests to access may be a source base station, or may be another base station, and may be referred to as a target base station.

The following describes several connection resume request methods into which a scenario in which the base station performs rejection is introduced. For example, the terminal requests to resume from the inactive state to the connected state, and the terminal requests, in the target base station, to resume from the inactive state to the connected state.

The target base station and the source base station may be different base stations, or may be a same base station. The following uses an example in which the target base station and the source base station are different base stations for description. For a case in which the target base station and the source base station are a same base station, only an interaction operation between the source base station and the target base station needs to be omitted.

Figure 3:
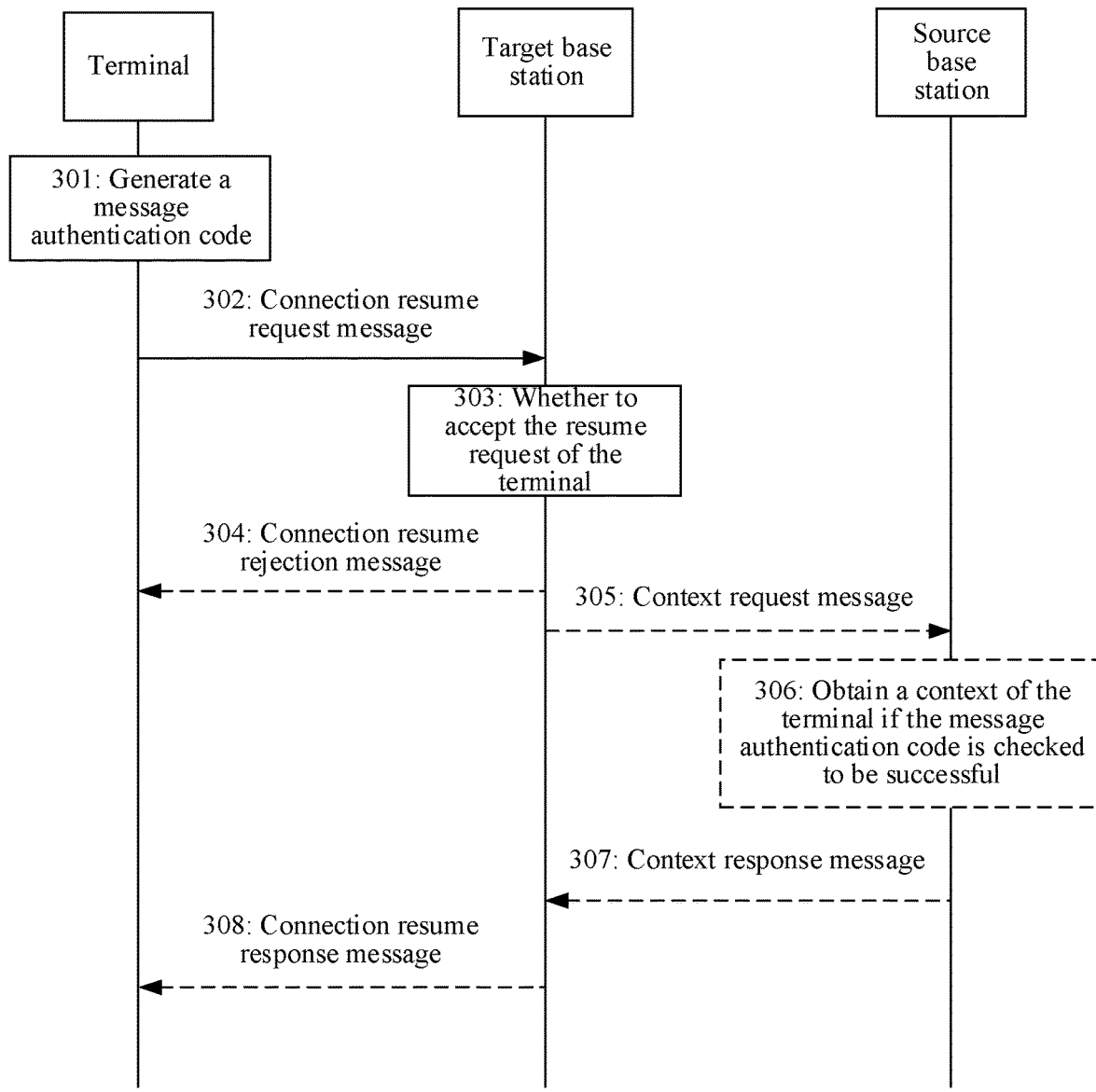
FIG. 3 is a flowchart of a connection resume request method according to this application.

FIG. 3 shows a connection resume request method according to this application. The method includes the following steps.

Step 301. A terminal generates a message authentication code (MAC).

The message authentication code is used to authenticate validity of the terminal. During implementation, the message authentication code is generated in at least the following two manners.

Manner 1. Generate the message authentication code based on an integrity protection algorithm of the terminal and an integrity protection key of the terminal, where the integrity protection key is the same as an integrity protection key used in previous resume.

In the manner 1, an integrity protection key used by the terminal to generate a message authentication code each time is the same as an integrity protection key used in the previous resume. Correspondingly, an integrity protection key of the terminal stored in a source base station is also the same as an integrity protection key used in the previous resume.

For example, Krrc-int is used to represent the integrity protection key of the terminal. If other parameters for generating the message authentication code are also the same, the message authentication code generated by the terminal each time is the same, that is, is generated based on Krrc-int and the integrity protection algorithm of the terminal.

Krrc-int is generated by the terminal based on an access stratum key, an identifier of the integrity protection algorithm of the terminal, and a type of the integrity protection algorithm of the terminal. Therefore, in the manner 1, that the integrity protection key Krrc-int of the terminal is the same as the integrity protection key used in the previous resume may also be understood as that the access stratum key of the terminal is the same as an access stratum key used in the previous resume.

For example, if KgNB is used to represent the access stratum key, in the manner 1, the access stratum key KgNB used when the terminal generates the message authentication code remains the same as the access stratum key used in the previous resume.

Manner 2. Generate the message authentication code based on the integrity protection algorithm of the terminal and the integrity protection key of the terminal, where the integrity protection key is regenerated.

In the manner 2, the integrity protection key used by the terminal when the terminal generates the message authentication code each time is regenerated, and is different from an integrity protection key used by the terminal at a previous time.

For example, if the integrity protection key used by the terminal at the previous time is Krrc-int, the terminal needs to regenerate and use a new integrity protection key, for example, use Krrc-int* to represent the new integrity protection key.

In an implementation, the terminal may generate the new integrity protection key Krrc-int* by using the following method, generating, by the terminal, a new access stratum key, and then generating Krrc-int* by using the new access stratum key, an identifier of the integrity protection algorithm of the terminal, and a type of the integrity protection algorithm of the terminal.

For example, if KgNB is used to represent a current access stratum key of the terminal, and KgNB* is used to represent a new access stratum key, in the manner 2, the terminal generates Krrc-int* based on KgNB*, the identifier of the integrity protection algorithm of the terminal, and the type of the integrity protection algorithm of the terminal, and then generates the message authentication code by using Krrc-int* and the integrity protection algorithm of the terminal.

Because the new access stratum key KgNB* is used, a finally generated message authentication code changes. That is, each time the terminal needs to use the message authentication code, the generated message authentication code is different from a message authentication code that is generated at a previous time.

In an example, the following describes a method for generating a new access stratum key KgNB*, and the method includes the following steps.

Step A1. A terminal obtains a first NCC and a second NCC.

The first NCC is an NCC that is sent by a source base station to the terminal in a suspend procedure of the terminal and that is stored by the terminal. For details, refer to step 202.

The second NCC is an NCC stored before the terminal obtains the first NCC.

Step A2. The terminal determines whether the first NCC is the same as the second NCC. If the first NCC is the same as the second NCC, step A3 is performed, or if the first NCC is different from the second NCC, step A4 is performed.

Step A3. The terminal obtains KgNB* based on KgNB.

KgNB refers to an old access stratum key (old KgNB), and may also be referred to as an original access stratum key (original KgNB), or may also be referred to as a previous access stratum key (old KgNB).

Correspondingly, KgNB* is a new access stratum key (new KgNB), and may also be referred to as an updated access stratum key (updated KgNB).

It should be noted that KgNB and KgNB* are merely symbolized representations. For example, in a 4G application, the access stratum key may be represented by KeNB or KeNB*. Different representation forms used by a symbol do not constitute a limitation on this application.

Optionally, in an implementation, in step A3, the terminal may obtain KgNB* based on KgNB, a target physical cell identifier (PCI), and an absolute radio frequency channel number-downlink (ARFCN-DL).

An implementation of obtaining KgNB* based on KgNB, the target PCI, and the ARFCN-DL is found in some approaches. For this, refer to related documents. For example, refer to related descriptions in the 3rd generation partnership project (3GPP) technical specification (TS) 33.401 or 3GPP TS 33.501. Details are not described herein.

Step A4. The terminal obtains a next hop (NH) based on the first NCC and the second NCC, and obtains KgNB* based on the NH.

The NH has a correspondence with the first NCC and the second NCC. The terminal may determine a quantity N of times for which derivation is performed on the NH based on the first NCC and the second NCC, then obtain a next NH through derivation performed on a current NH, and obtain another NH through derivation performed by using the next NH. This process is repeated until derivation is performed for N times, to obtain a final NH.

Optionally, in an implementation, the terminal may obtain KgNB* based on NH, the target PCI, and the ARFCN-DL.

An implementation of generating KgNB* is not disclosed herein. For this, refer to related documents. For example, refer to related descriptions in 3GPP TS 33.401 or 3GPP TS 33.501. Details are not described herein.

Optionally, after obtaining the integrity protection key in the foregoing two manners, the terminal may generate the message authentication code based on the integrity protection key, a source PCI, a source cell radio network temporary identifier (C-RNTI), a target cell identifier, and a resume constant.

In conclusion, a main difference between the foregoing manner 1 and manner 2 lies in that in the manner 1, each time the terminal uses the message authentication code, the generated message authentication code is the same as the message authentication code that is generated at the previous time, that is, the message authentication code remains unchanged, and in the manner 2, each time the terminal uses the message authentication code, the generated message authentication code is different from the message authentication code that is generated at the previous time, that is, the message authentication code keeps being updated.

Step 302. The terminal sends a connection resume request message to a target base station, and the target base station receives the connection resume request message from the terminal.

The connection resume request message sent by the terminal is used to request to resume an RRC connection. That is, the terminal requests to resume from an inactive state to a connected state.

In an implementation, the connection resume request message carries a resume identifier. The resume identifier is sent by the source base station to the terminal when the terminal enters the inactive state from the connected state. For example, refer to related descriptions of step 202. Details are not described herein again.

Further, the connection resume request message further carries the message authentication code generated in step 301.

Step 303. The target base station determines whether to accept the resume request of the terminal.

The target base station determines, based on a load capability, whether the terminal can access the target base station.

In one case, if the target base station has relatively heavy load and cannot be accessed by the terminal, the target base station may reject the resume request of the terminal, that is, reject access by the terminal to the target base station. In this case, step 304 is performed.

In another case, the target base station does not have very heavy load and may further be accessed by the terminal. In this case, the target base station may accept the resume request of the terminal, that is, agree to access by the terminal to the target base station. In this case, step 305 to step 308 are performed.

Step 304. The target base station sends a connection resume rejection message to the terminal, and the terminal receives the connection resume rejection message from the target base station.

The connection resume rejection message is used to indicate that resuming of the RRC connection that is performed by the terminal is rejected.

Optionally, information about a wait timer may be carried in the connection resume rejection message, where the information about the wait timer is used to indicate a time for rejecting access by the terminal, and may also be understood as a minimum time length that the terminal needs to wait before re-requesting to resume the RRC connection. For example, if the information about the wait timer indicates 30 minutes, the information is used to instruct the terminal to wait at least 30 minutes before re-initiating a connection resume request. That is, actions in step 301 and step 302 are re-performed, and a next connection resume request procedure is entered.

Step 305. The target base station sends a context request message to the source base station, and the source base station receives the context request message from the target base station.

The context request message is used to request a context of the terminal.

In an implementation, when determining to accept the connection resume request of the terminal, the target base station obtains a resume identifier from the connection resume request message. When determining, based on an identifier of the source base station that is in the resume identifier, that the terminal is previously connected to the source base station, the target base station sends the context request message to the source base station, where the context request message is used to request to obtain the context of the terminal, and the context request message carries the resume identifier and the message authentication code.

After receiving the context request message sent by the target base station, the source base station obtains the resume identifier from the context request message, and obtains an access stratum context of the terminal based on an identifier of the terminal that is in the resume identifier, where the access stratum context includes a security capability of the terminal. Optionally, the obtained access stratum context of the terminal further includes information such as an encryption algorithm and an integrity protection algorithm that are negotiated between the terminal and the source base station.

Step 306. The source base station obtains the context of the terminal if checking the message authentication code to be successful.

A method for checking the message authentication code by the source base station corresponds to a method for generating the message authentication code by the terminal.

If the terminal generates the message authentication code in the foregoing manner 1, a manner in which the source base station checks the message authentication code is as follows. The source base station obtains an integrity protection algorithm (which may also be referred to as an integrity protection algorithm of the source base station) and an access stratum key that are in the context of the terminal, and then obtains an integrity protection key (which may also be referred to as an integrity protection key of the source base station) through derivation based on the integrity protection algorithm and the access stratum key, and the source base station obtains an integrity protection algorithm (which may also be referred to as an integrity protection algorithm of the source base station) and an integrity protection key (which may also be referred to as an integrity protection key of the source base station) that are in the context of the terminal. Then, the source base station generates the message authentication code based on the integrity protection algorithm of the source base station and the integrity protection key of the source base station, and compares the generated message authentication code with a message authentication code in the context request message. If the generated message authentication code is the same as the message authentication code in the context request message, the check is successful. If the generated message authentication code is different from the message authentication code in the context request message, the check is failed.

If the terminal generates the message authentication code in the foregoing manner 2, a manner in which the source base station checks the message authentication code is as follows. The source base station determines whether a next hop NH is used; and if the next hop NH is not used, the source base station obtains a new access stratum key KgNB* based on the NH; or if the next hop NH is used, the source base station obtains a new access stratum key KgNB* based on a current access stratum key KgNB of the terminal. After obtaining KgNB*, the source base station generates Krrc-int* based on KgNB*, an identifier of the integrity protection algorithm of the source base station, and a type of the integrity protection algorithm of the source base station, then generates the message authentication code by using Krrc-int* and the integrity protection algorithm of the source base station, and compares the generated message authentication code with a message authentication code in the context request message. If the generated message authentication code is the same as the message authentication code in the context request message, the check is successful. If the generated message authentication code is different from the message authentication code in the context request message, the check is failed Optionally, the source base station may alternatively generate the message authentication code based on the integrity protection key, a source PCI, a source cell radio network temporary identifier (C-RNTI), a target cell identifier, and a resume constant.

Step 307. The source base station sends a context response message to the target base station if checking the message authentication code to be successful.

The context response message may include the context of the terminal, for example, include the integrity protection algorithm of the source base station and the integrity protection key of the source base station. Optionally, the context response message further includes generated KgNB*.

Step 308. The target base station sends a connection resume response message to the terminal, and the terminal receives the connection resume response message from the target base station.

The connection resume response message is used to instruct the terminal to resume the RRC connection. Optionally, encryption and integrity protection may be respectively performed on the connection resume response message by using an encryption key and the integrity protection key that are generated by the target base station based on the integrity protection algorithm of the source base station and KgNB*. KgNB* used by the target base station may be from the source base station. Details are not described herein.

After step 308, a subsequent procedure of entering the connected state by the terminal from the inactive state is further included. For specific details, refer to descriptions in related documents. Details are not described.

The following problems exist in the foregoing connection resume method.

In one aspect, if the manner 1 is used to generate the message authentication code in step 301, the message authentication code generated by the terminal each time is the same. When the terminal sends the connection resume request message to the target base station for the first time, if the target base station rejects the connection resume request of the terminal, before the terminal sends the connection resume request message next time (that is, the second time), an attacker may steal the message authentication code carried when the terminal sends the connection resume request message for the first time. Then, the attacker pretends to be the terminal and sends a connection resume request message to the target base station, where the connection resume request message carries the message authentication code stolen by the attacker. If load of the target base station is not very heavy, step 305 to step 308 are performed. Consequently, the source base station checks the message authentication code to be successful, then adds the context of the terminal to the context response message, and sends the context response message to the target base station. In addition, the source base station deletes the context of the terminal. Further, when the terminal resends the connection resume request message to the target base station for the second time, because the source base station has deleted the context of the terminal, the terminal cannot be authenticated. Consequently, the terminal cannot enter the connected state from the inactive state. Certainly, if load of the target base station is relatively heavy, the target base station rejects the connection resume request of the attacker, but the attacker may continuously attack the target base station until the target base station accepts the connection resume request of the attacker. Therefore, the manner 1 has the foregoing problem of being vulnerable to an attack, and consequently, the terminal may not enter the connected state from the inactive state.

In another aspect, if the manner 2 is used to generate the message authentication code in step 301, the message authentication code generated by the terminal each time is different. When the terminal sends the connection resume request message to the target base station for the first time, if the target base station rejects the connection resume request of the terminal, because the access stratum key stored in the terminal is already updated to KgNB* in this case, but the target base station does not notify the source base station that the key is already updated, the access stratum key stored in the source base station is still the original access stratum key KgNB. Further, when the terminal sends the connection resume request message to the target base station for the second time, if the target base station accepts the connection resume request of the terminal, the access stratum key stored in the terminal is KgNB*, and the access stratum key stored in the source base station is KgNB. Consequently, the source base station fails to check the message authentication code sent by the terminal, and the terminal cannot enter the connected state from the inactive state. Therefore, the manner 2 may also have a problem that the terminal cannot enter the connected state from the inactive state.

For the foregoing problem in the connection resume request method shown in FIG. 3, this application provides the following solutions. Descriptions are separately provided below.

Solution 1

The solution 1 may be used to resolve a problem existing when the manner 1 is used to generate the message authentication code in step 301.

Figure 4:
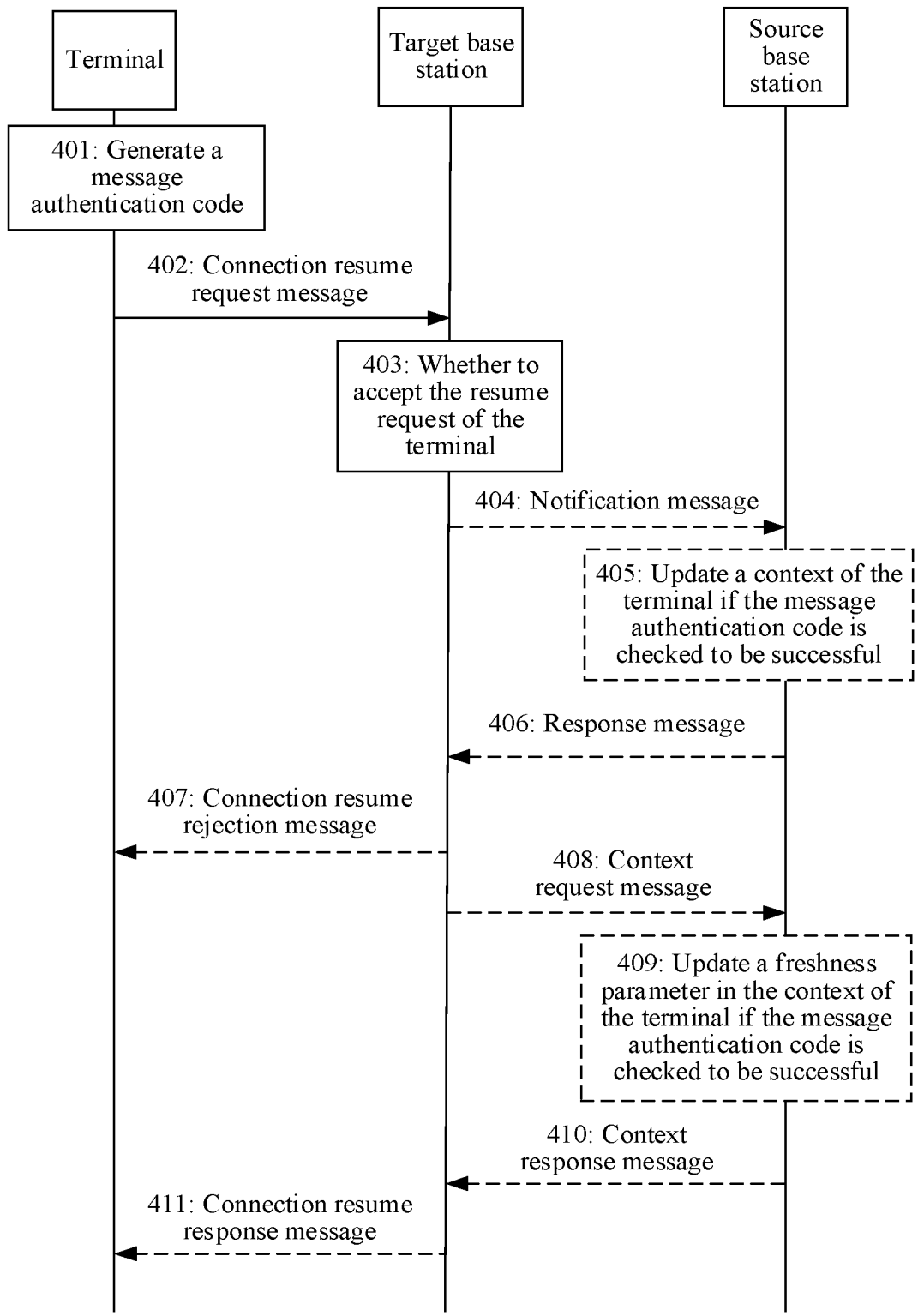
FIG. 4 is a flowchart of another connection resume request method according to this application.

FIG. 4 is a flowchart of a connection resume request method according to this application, and the method includes the following steps.

Step 401. A terminal generates a message authentication code based on a freshness parameter and an integrity protection key that is of the terminal.

Freshness parameters used to generate message authentication codes at two consecutive times are different. That is, a value of the freshness parameter changes each time the message authentication code is generated. Consequently, a freshness parameter used when a message authentication code is currently generated is different from a freshness parameter used when a message authentication code is generated at a previous time.

In an implementation, the freshness parameter includes a PDCP count, and the PDCP count may include an uplink PDCP count and a downlink PDCP count. The uplink PDCP count is increased by 1 each time the terminal sends an uplink PDCP data packet, and the downlink PDCP count is increased by 1 each time a base station sends a downlink PDCP data packet. For example, the PDCP count may be an uplink PDCP count of a signaling radio bearer (SRB). Optionally, the PDCP count may be reset to zero each time a radio bearer is re-established. Because the PDCP count keeps changing, the message authentication code generated by the terminal each time is different from the message authentication code that is generated at a previous time.

In another implementation, the freshness parameter may include a quantity of rejection times, and the quantity of rejection times may be used to indicate a quantity of times for which resuming of the RRC connection that the terminal attempts to perform is rejected by a network side. The quantity of rejection times is increased by 1 each time resuming that the terminal attempts to perform is rejected by the network side. Optionally, the quantity of rejection times may be reset to zero each time the RRC connection is successfully resumed. Because the quantity of rejection times keeps changing, the message authentication code generated by the terminal each time is different from the message authentication code that is generated at a previous time.

During implementation, the message authentication code may be generated based on the freshness parameter, the integrity protection key of the terminal, and the integrity protection algorithm of the terminal.

Step 402. The terminal sends a connection resume request message to a target base station, and the target base station receives the connection resume request message from the terminal.

The connection resume request message is used to request to resume the RRC connection, and the connection resume request message includes the message authentication code and a resume identifier. Optionally, the connection resume request message further includes an indication parameter, and the indication parameter is used to indicate the freshness parameter. For example, the indication parameter may be the freshness parameter, or may be a parameter that may indicate the freshness parameter. The connection resume request message further includes the resume identifier.

For example, if the freshness parameter is the quantity of rejection times, the connection resume request message includes the message authentication code and the resume identifier. If the freshness parameter is the PDCP count, the connection resume request message includes the message authentication code, the resume identifier, and the indication parameter, and the indication parameter is used to indicate the PDCP count.

If the freshness parameter is the PDCP count, and the PDCP count is represented by using a binary bit, the indication parameter is the PDCP count, that is, all bits of the PDCP count. Alternatively, the indication parameter may be some bits of a PDCP count.

For example, it is assumed that the PDCP count is represented by using 32 bits. Because a change between PDCP counts used when message authentication codes are generated at two consecutive times is not very large, only a low-order bit changes between the PDCP counts used at the two consecutive times, and a high-order bit does not change. Therefore, the indication parameter may be represented by using some low bits of the PDCP count. For example, a PDCP count used by the terminal to generate the message authentication code at a previous time is "00000000000011111111111100011111", and a PDCP count used by the terminal to generate the message authentication code this time is "00000000000011111111111100100011". It may be found that only five lower bits of the PDCP count change, but 27 higher bits do not change. Therefore, N lower bits of the PDCP count may be selected as the indication parameter, where N is greater than 1 and less than 32. Certainly, the indication parameter may alternatively be all bits of the PDCP count.

If the freshness parameter is the quantity of rejection times, the terminal and the source base station separately maintain a quantity of times for which resuming of the connection that is performed by the terminal is rejected.

According to step 401 and step 402, the message authentication code generated by the terminal each time is different from the message authentication code that is generated at the previous time. Therefore, even if an attacker steals the message authentication code that is used by the terminal at the previous time, the attacker cannot succeed in the attack because the "expired" message authentication code is used.

The following provides subsequent implementation methods of the target base station and the source base station.

Optionally, after step 402, the method further includes the following method steps.

Step 403. The target base station determines whether to accept the resume request of the terminal.

The target base station determines, based on a load capability, whether the terminal can access the target base station.

In one case, if the target base station has relatively heavy load and cannot be accessed by the terminal, the target base station may reject the resume request of the terminal, that is, reject access by the terminal to the target base station. In this case, step 404 to step 407 are performed.

In another case, the target base station does not have very heavy load and may further be accessed by the terminal. In this case, the target base station may accept the resume request of the terminal, that is, agree to access by the terminal to the target base station. In this case, step 408 to step 411 are performed.

Step 404. The target base station sends a notification message to the source base station, and the source base station receives the notification message from the target base station.

The notification message includes the message authentication code and the resume identifier that are obtained by the target base station from the connection resume request message, and optionally further includes an indication parameter. A context of the terminal that is in the source base station and that is instructed to update includes the freshness parameter.

The notification message has one or more of the following functions, the notification message is used to instruct to update the context of the terminal in the source base station; the notification message is used to notify that the target base station rejects resuming of a connection that is performed by the terminal; the notification message is used to instruct to update the freshness parameter in the context of the terminal in the source base station; and the notification message is used to instruct to update a key in the context of the terminal in the source base station.

Step 405. The source base station checks the message authentication code, and updates the context of the terminal if checking the message authentication code to be successful.

In this step, the source base station first obtains the context of the terminal in the source base station based on the resume identifier in the notification message.

Then, the source base station determines the freshness parameter.

In an example, the source base station determines the freshness parameter based on the indication parameter. For example, when the freshness parameter is the PDCP count, the source base station determines, based on the indication parameter, the PDCP count indicated by the indication parameter. During implementation, if the indication parameter indicates some bits of a PDCP count, the source base station may determine, based on some high bits of a PDCP count that is currently stored in the source base station and some low bits of the PDCP count that are indicated by the indication parameter, the PDCP count indicated by the indication parameter.

In another example, the source base station directly determines the freshness parameter. For example, when the freshness parameter is the quantity of rejection times, the source base station determines a current quantity of rejection times as the quantity of rejection times. That is, the target base station may directly obtain the quantity of rejections of the terminal locally.

Then, the source base station generates the message authentication code based on the freshness parameter, the integrity protection key of the source base station, and the integrity protection algorithm of the source base station. If the generated message authentication code is the same as a message authentication code that is generated by the terminal and that is carried in the notification message, the check is successful, or if the generated message authentication code is different from the message authentication code that is generated by the terminal and that is carried in the notification message, the check is failed.

Optionally, the source base station may generate the message authentication code based on the freshness parameter, the integrity protection key of the source base station, the integrity protection algorithm of the source base station, a source PCI, a source cell radio network temporary identifier (C-RNTI), a target cell identifier, and a resume constant.

The source base station updates the freshness parameter in the context of the terminal if checking the message authentication code to be successful. For example, when the freshness parameter is the PDCP count, updating, by the source base station, the context of the terminal in the source base station includes updating, by the source base station, a value of the PDCP count in the context of the terminal to a value of the PDCP count in the notification message if the value of the PDCP count in the notification message is greater than the value of the PDCP count in the context of the terminal in the source base station; or is understood as updating the value of the PDCP count in the context of the terminal to a value of the PDCP count indicated by the indication parameter. For another example, when the freshness parameter is the quantity of rejection times, updating, by the source base station, the context of the terminal in the source base station based on the freshness parameter includes increasing, by the source base station, the quantity of rejection times by 1.

In another implementation, alternatively, the source base station may first determine whether the value of the PDCP count in the notification message is greater than the value of the PDCP count in the context of the terminal in the source base station, if the value of the PDCP count in the notification message is greater than the value of the PDCP count in the context of the terminal in the source base station, the source base station checks the message authentication code, and if checking the message authentication code to be successful, the source base station updates the freshness parameter in the context of the terminal based on the freshness parameter. An update method is as follows, the source base station updates the value of the PDCP count in the context of the terminal to the value of the PDCP count in the notification message.

Step 406. The source base station sends a response message to the target base station, and the target base station receives the response message from the source base station.

Step 406 is an optional step. The response message is used by the source base station to notify the target base station after update of the context of the terminal is completed.

Step 407. The target base station sends a connection resume rejection message to the terminal, and the terminal receives the connection resume rejection message from the target base station.

Step 407 is the same as step 304. For details, refer to the foregoing description.

When the freshness parameter is the quantity of rejection times, after receiving the connection resume rejection message, the terminal updates the quantity of rejection times, including increasing the quantity of rejection times by 1.

It should be noted that there is no limitation on a sequence between step 407 and step 404 to step 406, for example, step 407 may be performed before step 404, or may be performed after step 406, or may be performed between step 404 and step 406.

According to step 404 to step 407, when the target base station determines to reject the connection resume request of the terminal, in one aspect, the target base station notifies the terminal that the connection resume request is rejected, and in another aspect, the target base station further instructs the source base station to update the context of the terminal, and for example, update the freshness parameter stored in the source base station, so that freshness parameter consistency is maintained between the terminal and the source base station.

Step 408. The target base station sends a context request message to the source base station, and the source base station receives the context request message from the target base station.

The context request message includes the message authentication code generated by the terminal and the resume identifier, and the context request message is used to request to obtain the context of the terminal. Optionally, the context request message further includes the indication parameter.

Step 409. The source base station updates the freshness parameter in the context of the terminal if checking the message authentication code to be successful.

For a manner in which the source base station checks the message authentication code and a manner in which the source base station updates the freshness parameter in the context of the terminal, refer to the description in step 405. Details are not described herein again.

Step 410. The source base station sends a context response message to the target base station, and the target base station receives the context response message from the source base station.

Step 411. The target base station sends a connection resume response message to the terminal, and the terminal receives the connection resume response message from the target base station.

Step 410 and step 411 are the same as step 307 and step 308. For details, refer to the foregoing description. Details are not described herein again.

According to step 408 to step 411, when the target base station determines to accept the resuming of the connection to the terminal, the source base station checks the message authentication code of the terminal based on the freshness parameter. When the check is successful, in one aspect, the source base station updates the freshness parameter in the context of the terminal in the source base station, and in another aspect, the source base station sends an obtained context of the terminal to the target base station.

According to the method in step 401 to step 411, the freshness parameter is introduced into an input parameter used by the terminal to generate the message authentication code. Correspondingly, the freshness parameter is also introduced into an input parameter used by the source base station to check the message authentication code. In one aspect, if the target base station rejects the connection resume request of the terminal, the target base station may instruct the source base station to update the freshness parameter in the context of the terminal in step 404, so that freshness parameter consistency is maintained between the terminal and the source base station. In another aspect, if the target base station accepts the connection resume request of the terminal, the target base station may request to obtain the context of the terminal from the source base station in step 408, and the source base station may further update the freshness parameter in the context of the terminal in the source base station in this process, so that freshness parameter consistency is maintained between the terminal and the source base station.

The foregoing solution 1 can effectively resolve the problem of being vulnerable to an attack when the manner 1 is used to generate the message authentication code in step 301. The following provides a description with reference to an example.

Using an example in which a freshness parameter is a PDCP count, it is assumed that values of the PDCP counts currently stored in the terminal and the source base station are both 5, and the terminal is currently in an inactive state.

The terminal sends a connection resume request message to a target base station for the first time, where the connection resume request message carries a message authentication code, an indication parameter, and a resume identifier, the message authentication code is generated based on a PDCP count and an integrity protection key that is of the terminal, and the PDCP count indicated by the indication parameter is greater than 5, for example, is 10.

If the target base station rejects the connection resume request of the terminal, a connection resume rejection message sent to the terminal carries information about a wait timer, to instruct the terminal to attempt to re-initiate a connection resume request 30 minutes later. In addition, the target base station instructs the source base station to update the PDCP count in the context of the terminal in the source base station to 10.

It is assumed that before the terminal sends the connection resume request message to the target base station for the second time, an attacker steals the message authentication code and the resume identifier from the connection resume request message sent by the terminal to the target base station for the first time, where the PDCP count used to generate the message authentication code is 10.

Then, the attacker sends the connection resume request message to the target base station, where the connection resume request message carries the stolen message authentication code and resume identifier. After receiving the connection resume request message, the target base station sends a context request message to the source base station if the target base station accepts the resume request of the attacker. Then, the source base station checks the message authentication code sent by the attacker. Because the PDCP count used when the message authentication code sent by the attacker is generated is 10, and the PDCP count in the context of the terminal in the source base station is also 10, the two are equal. Therefore, the check is failed. Therefore, the attack performed by the attacker fails.

Using an example in which the freshness parameter is the quantity of rejection times, it is assumed that values of the quantity of rejection times currently stored in the terminal and the source base station are both 2, and the terminal is currently in an inactive state.

The terminal sends a connection resume request message to the target base station for the first time, where the connection resume request message carries a message authentication code and a resume identifier. The message authentication code is generated based on a quantity of rejection times and an integrity protection key that is of the terminal, and in this case, the quantity of rejection times is 2.

If the target base station rejects the connection resume request of the terminal, a connection resume rejection message sent to the terminal carries information about a wait timer, to instruct the terminal to attempt to re-initiate a connection resume request 30 minutes later. In this case, the terminal updates the quantity of rejection times to 3. In addition, the target base station instructs the source base station to update the quantity of rejection times in the context of the terminal in the source base station to 3.

It is assumed that before the terminal sends the connection resume request message to the target base station for the second time, an attacker steals the message authentication code and the resume identifier from the connection resume request message sent by the terminal to the target base station for the first time, where the quantity of rejection times used to generate the message authentication code is 2.

Then, the attacker sends the connection resume request message to the target base station, where the connection resume request message carries the stolen message authentication code and resume identifier. After receiving the connection resume request message, the target base station sends a context request message to the source base station if the target base station accepts the resume request of the attacker. Then, the source base station checks the message authentication code sent by the attacker. Because the quantity of rejection times used when the message authentication code sent by the attacker is generated is 2, and the quantity of rejection times in the context of the terminal in the source base station is 3, the check is failed. Therefore, the attack performed by the attacker fails.

Therefore, the foregoing solution 1 provided in the application can effectively resolve the problem of the manner 1 in which the message authentication code is generated in step 301, and can effectively resist the attack of the attacker.

Solution 2

The solution 2 may be used to resolve a problem existing when the manner 2 is used to generate the message authentication code in step 301.

Step 501. A terminal generates a message authentication code.

Step 501 is the same as the manner 2 in step 301. For details, refer to the foregoing description.

In step 501, when generating the message authentication code, the terminal further updates an access stratum key, that is, updates KgNB to KgNB*, and further updates an integrity protection key, that is, updates Krrc-int to Krrc-int*.

Step 502. The terminal sends a connection resume request message to a target base station, and the target base station receives the connection resume request message from the terminal.

Step 502 is the same as step 302. For details, refer to the foregoing description.

Step 503. The target base station determines whether to accept the resume request of the terminal.

The target base station determines, based on a load capability, whether the terminal can access the target base station.

In one case, if the target base station has relatively heavy load and cannot be accessed by the terminal, the target base station may reject the resume request of the terminal, that is, reject access by the terminal to the target base station. In this case, step 504 to step 507 are performed.

In another case, the target base station does not have very heavy load and may further be accessed by the terminal. In this case, the target base station may accept the resume request of the terminal, that is, agree to access by the terminal to the target base station. In this case, step 508 to step 511 are performed.

Step 504. The target base station sends a notification message to the source base station, and the source base station receives the notification message from the target base station.

The notification message includes a message authentication code and a resume identifier that are obtained by the target base station from the connection resume request message.

The notification message has one or more of the following functions, the notification message is used to instruct to update a context of the terminal in the source base station; the notification message is used to notify that the target base station rejects resuming of a connection that is performed by the terminal; the notification message is used to instruct to update a freshness parameter in the context of the terminal in the source base station; and the notification message is used to instruct to update a key in the context of the terminal in the source base station.

The key may be an access stratum key and/or an integrity protection key.

Step 505. The source base station checks the message authentication code, and updates the key in the context of the terminal if checking the message authentication code to be successful.

In this step, the source base station first obtains the context of the terminal in the source base station based on the resume identifier in the notification message.

Then, the source base station generates the message authentication code based on the integrity protection algorithm of the source base station and the integrity protection key of the source base station. If the generated message authentication code is the same as the message authentication code carried in the notification message, the check is successful, or if the generated message authentication code is different from the message authentication code carried in the notification message, the check is failed. The integrity protection key of the source base station that is used by the source base station to generate the message authentication code is a new integrity protection key Krrc-int* generated by the source base station. For a specific generation method, refer to a related description in step 306. Details are not described herein again.

The source base station checks the message authentication code, and if checking the message authentication code to be successful, updates the access stratum key and/or the integrity protection key in the context of the terminal.

Step 506. The source base station sends a response message to the target base station, and the target base station receives the response message from the source base station.

Step 506 is an optional step. The response message is used by the source base station to notify the target base station after update of the context of the terminal is completed.

Step 507. The target base station sends a connection resume rejection message to the terminal, and the terminal receives the connection resume rejection message from the target base station.

Step 507 is the same as step 304. For details, refer to the foregoing description.

It should be noted that there is no limitation on a sequence between step 507 and step 504 to step 506, that is, step 507 may be performed before step 504, or may be performed after step 506, or may be performed between step 504 and step 506.

According to step 504 to step 507, when the target base station determines to reject the connection resume request of the terminal, in one aspect, the target base station notifies the terminal that the connection resume request is rejected, and in another aspect, the target base station further instructs the source base station to update the context of the terminal, so that key consistency is maintained between the terminal and the source base station.

Step 508. The target base station sends a context request message to the source base station, and the source base station receives the context request message from the target base station.

The context request message includes the message authentication code generated by the terminal and the resume identifier, and the context request message is used to request to obtain the context of the terminal.

This step is the same as step 305. For details, refer to the foregoing description.

Step 509. The source base station obtains the context of the terminal if checking the message authentication code to be successful.

For a manner of checking the message authentication code by the source base station, refer to the manner of checking the message authentication code used by the source base station when the terminal generates the message authentication code in the manner 2 in step 306.

Step 510. The source base station sends a context response message to the target base station if checking the message authentication code to be successful.

The context response message may include the context of the terminal, for example, include the integrity protection algorithm of the source base station and the integrity protection key of the source base station. Optionally, the context response message further includes generated KgNB*.

Step 511. The target base station sends a connection resume response message to the terminal, and the terminal receives the connection resume response message from the target base station.

The connection resume response message is used to instruct the terminal to resume the RRC connection. Optionally, encryption and integrity protection may be respectively performed on the connection resume response message by using an encryption key and the integrity protection key that are generated by the target base station based on the integrity protection algorithm of the source base station and KgNB*. Details are not described herein.

After step 308, a subsequent procedure of entering the connected state by the terminal from the inactive state is further included. For details, refer to descriptions in related documents. Details are not described herein.

The connection resume request method shown in step 501 to step 511 can effectively resolve a problem existing when the message authentication code is generated in the manner 2 in step 301. In the solution shown in FIG. 5, when the target base station determines to reject the connection resume request of the terminal, the target base station further sends the notification message to the source base station in step 504, to instruct the source base station to update the key. Therefore, key consistency is always maintained between the terminal and the source base station, and therefore a problem that the terminal cannot resume a connection due to key asynchronization between the terminal and the source base station can be effectively resolved.

Figure 5:
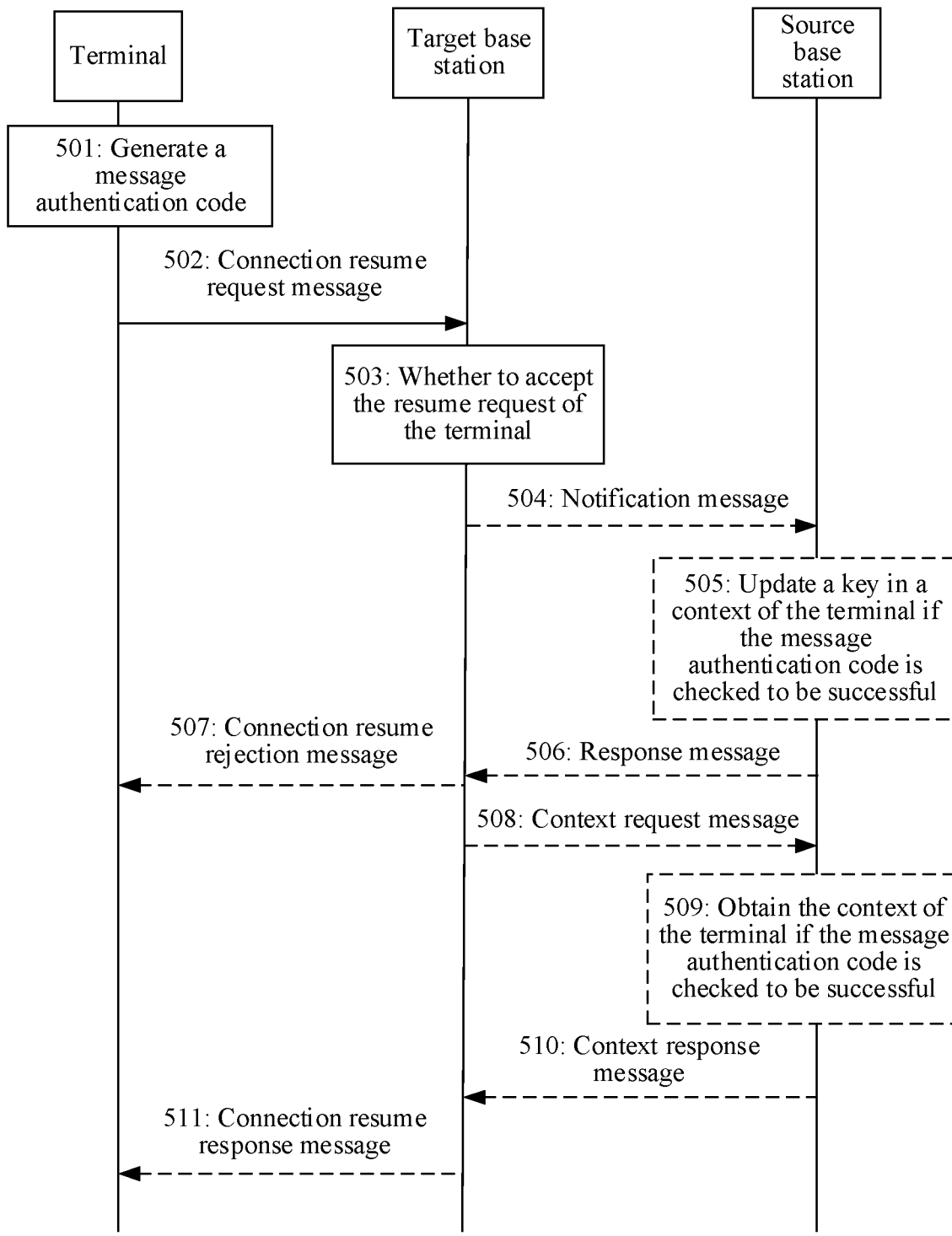
FIG. 5 is a flowchart of another connection resume request method according to this application.

In an alternative method, in the procedure shown in FIG. 5, in a scenario in which the target base station rejects the connection resume request of the terminal, step 504 to step 506 may be further deleted, and an operation of the terminal is added after step 507, resuming, by the terminal, the access stratum key of the terminal to the access stratum key before the update.

Because in the scenario in which the target base station rejects the connection resume request of the terminal, the terminal already updates the access stratum key, to maintain key consistency between the terminal and the source base station, the terminal may alternatively roll back the key to resume updated the access stratum key of the terminal to the access stratum key before the update. Therefore, an objective that key consistency is always maintained between the terminal and the source base station can also be achieved, and further a problem that the terminal cannot resume a connection due to key asynchronization between the terminal and the source base station can be effectively resolved.

Solution 3

The solution 3 is a solution obtained by combining the foregoing solution 1 and solution 2. In addition to resolving the foregoing problem of key inconsistency, the solution 3 can further effectively resist an attack of an attacker.

Step 601. A terminal generates a message authentication code.

Herein, the message authentication code is generated with reference to the manner of generating the message authentication code in step 401 and the manner of generating the message authentication code in step 501. For example, the terminal generates the message authentication code based on an integrity protection algorithm of the terminal, an integrity protection key of the terminal, and a freshness parameter, where the integrity protection key of the terminal is Krrc-int*, and krrc-int* is generated based on an updated access stratum key KgNB*, an identifier of the integrity protection algorithm of the terminal, and a type of the integrity protection algorithm of the terminal.

Step 602. The terminal sends a connection resume request message to a target base station, and the target base station receives the connection resume request message from the terminal.

The connection resume request message includes the message authentication code and a resume identifier. Optionally, the connection resume request further includes an indication parameter, and the indication parameter is used to indicate the freshness parameter.

Step 603. The target base station determines whether to accept the resume request of the terminal.

The target base station determines, based on a load capability, whether the terminal can access the target base station.

In one case, if the target base station has relatively heavy load and cannot be accessed by the terminal, the target base station may reject the resume request of the terminal, that is, reject access by the terminal to the target base station. In this case, step 604 to step 607 are performed.

In another case, the target base station does not have very heavy load and may further be accessed by the terminal. In this case, the target base station may accept the resume request of the terminal, that is, agree to access by the terminal to the target base station. In this case, step 608 to step 611 are performed.

Step 604. The target base station sends a notification message to the source base station, and the source base station receives the notification message from the target base station.

The notification message includes the message authentication code and the resume identifier that are obtained by the target base station from the connection resume request message. Optionally, the notification message may further include the indication parameter.

The notification message has one or more of the following functions, the notification message is used to instruct to update a context of the terminal in the source base station; the notification message is used to notify that the target base station rejects resuming of a connection that is performed by the terminal; the notification message is used to instruct to update the freshness parameter in the context of the terminal in the source base station; and the notification message is used to instruct to update a key in the context of the terminal in the source base station.

The key may be an access stratum key and/or an integrity protection key.

Step 605. The source base station checks the message authentication code, and updates the freshness parameter and the key that are in the context of the terminal if checking the message authentication code to be successful.

In this step, the source base station first determines the context of the terminal in the source base station based on the resume identifier in the notification message.

Then, the source base station determines the freshness parameter. The source base station may determine the freshness parameter based on the indication parameter in the notification message. For example, when the freshness parameter is a PDCP count, the source base station determines, based on the indication parameter, a PDCP count indicated by the indication parameter. The source base station may alternatively directly determine the freshness parameter. For example, when the freshness parameter is a quantity of rejection times, the source base station determines a current quantity of rejection times as the quantity of rejection times.

Then, the source base station generates the message authentication code based on the freshness parameter, the integrity protection key of the source base station, and the integrity protection algorithm of the source base station. If the generated message authentication code is the same as a message authentication code that is generated by the terminal and that is carried in the notification message, the check is successful, or if the generated message authentication code is different from the message authentication code that is generated by the terminal and that is carried in the notification message, the check is failed. The integrity protection key of the source base station that is used by the source base station to generate the message authentication code is a new integrity protection key Krrc-int* generated by the source base station.

The source base station updates the freshness parameter in the context of the terminal based on the freshness parameter if checking the message authentication code to be successful. For details, refer to the related description of step 405. In addition, the source base station further updates the key in the context of the terminal. For example, the integrity protection key Krrc-int in the source base station is updated to Krrc-int*, and/or the access stratum key KgNB in the source base station is updated to KgNB*.

Step 606. The source base station sends a response message to the target base station, and the target base station receives the response message from the source base station.

Step 606 is an optional step. The response message is used by the source base station to notify the target base station after update of the context of the terminal is completed.

Step 607. The target base station sends a connection resume rejection message to the terminal, and the terminal receives the connection resume rejection message from the target base station.

Step 607 is the same as step 404. For details, refer to the foregoing description.

It should be noted that there is no limitation on a sequence between step 607 and step 604 to step 606, that is, step 607 may be performed before step 604, or may be performed after step 606, or may be performed between step 604 and step 606.

According to step 604 to step 607, when the target base station determines to reject the connection resume request of the terminal, in one aspect, the target base station notifies the terminal that the connection resume request is rejected, and in another aspect, the target base station further instructs the source base station to update the context of the terminal, and for example, update the freshness parameter and the key that are stored in the source base station, so that freshness parameter consistency and key consistency are maintained between the terminal and the source base station.

Step 608. The target base station sends a context request message to the source base station, and the source base station receives the context request message from the target base station.

The context request message includes the message authentication code generated by the terminal, the freshness parameter, and the resume identifier, and the context request message is used to request to obtain the context of the terminal.

Step 609. The source base station updates the freshness parameter and the key that are in the context of the terminal if checking the message authentication code to be successful.

For a manner in which the source base station checks the message authentication code and a manner in which the source base station updates the freshness parameter and the key that are in the context of the terminal, refer to the description in step 605. Details are not described herein again.

Step 610. The source base station sends a context response message to the target base station, and the target base station receives the context response message from the source base station.

Step 611. The target base station sends a connection resume response message to the terminal, and the terminal receives the connection resume response message from the target base station.

Step 610 and step 611 are the same as step 307 and step 308. For details, refer to the foregoing description. Details are not described herein again.

According to step 608 to step 611, when the target base station determines to accept the resuming of the connection to the terminal, the source base station checks the message authentication code of the terminal based on the freshness parameter, the integrity protection key of the source base station, and the integrity protection algorithm of the source base station. When the check is successful, in one aspect, the source base station updates the freshness parameter in the context of the terminal in the source base station based on the freshness parameter of the terminal and updates the key in the context of the terminal in the source base station, and in another aspect, the source base station sends an obtained context of the terminal to the target base station.

According to the method in step 601 to step 611, the freshness parameter is introduced into an input parameter used by the terminal to generate the message authentication code. Correspondingly, the freshness parameter is also introduced into an input parameter used by the source base station to check the message authentication code. In addition, the integrity protection key used to generate the message authentication code is generated based on an updated integrity protection key. In one aspect, if the target base station rejects the connection resume request of the terminal, the target base station may instruct the source base station to update the freshness parameter and the key that are in the context of the terminal in step 604, so that freshness parameter consistency and key consistency are maintained between the terminal and the source base station. In another aspect, if the target base station accepts the connection resume request of the terminal, the target base station may request to obtain the context of the terminal from the source base station in step 608, and the source base station may further update the freshness parameter and the key that are in the context of the terminal in the source base station in this process, so that freshness parameter consistency and key consistency are maintained between the terminal and the source base station.

According to the method in step 601 to step 611, in one aspect, key synchronization can be maintained between the terminal and the source base station, and in another aspect, an attack from an attacker can be effectively resisted. Therefore, this helps the terminal smoothly enter the connected state from the inactive state.

Solution 4

The solution 4 may be used to resolve a problem existing when the manner 2 is used to generate the message authentication code in step 301.

Step 701. A terminal generates a message authentication code.

Step 701 is the same as the manner 2 in step 301. For details, refer to the foregoing description.

In step 701, before generating the message authentication code, the terminal updates an access stratum key, that is, updates KgNB to KgNB*, and further updates an integrity protection key, that is, updates Krrc-int to Krrc-int*. Then, the terminal generates the message authentication code based on the updated integrity protection key.

Step 702. The terminal sends a connection resume request message to a target base station, and the target base station receives the connection resume request message from the terminal.

Step 702 is the same as step 302. For details, refer to the foregoing description.

Step 703. The target base station determines whether to accept the resume request of the terminal.

The target base station determines, based on a load capability, whether the terminal can access the target base station.

In one case, if the target base station has relatively heavy load and cannot be accessed by the terminal, the target base station may reject the resume request of the terminal, that is, reject access by the terminal to the target base station. In this case, step 704 and step 705 are performed.

In another case, the target base station does not have very heavy load and may further be accessed by the terminal. In this case, the target base station may accept the resume request of the terminal, that is, agree to access by the terminal to the target base station. In this case, step 706 to step 709 are performed.

Step 704. The target base station sends a connection resume rejection message to the terminal, and the terminal receives the connection resume rejection message from the target base station.

Step 704 is the same as step 304. For details, refer to the foregoing description.

Step 705. The terminal resumes the access stratum key of the terminal to the access stratum key before the update.

An implementation may be that before receiving the rejection message, the terminal stores the access stratum key before the update, for example, KgNB. After the terminal receives the rejection message, the terminal keeps the access stratum key before the update as a current or stored access stratum key. Optionally, after receiving the rejection message, the terminal may further delete the updated access stratum key, for example, KgNB*.

Another implementation may be that before receiving the rejection message, the terminal stores a security context before update, and the security context before update includes the access stratum key before the update, for example, KgNB. After receiving the rejection message, the terminal uses the security context before update as a current or stored security context. Optionally, after receiving the rejection message, the terminal may further delete an updated security context. For example, the security context may be an AS security context of the terminal.

After resuming the access stratum key of the terminal to the access stratum key before the update, the terminal keeps the access stratum key before the update, and when resuming a connection next time, the terminal re-performs the manner 2 in step 701 to generate the message authentication code.

Because in the scenario in which the target base station rejects the connection resume request of the terminal, the terminal already updates the access stratum key, to maintain key consistency between the terminal and the source base station, the terminal may alternatively roll back the key to resume the access stratum key of the terminal to the access stratum key before the update. Therefore, an objective that key consistency is always maintained between the terminal and the source base station can also be achieved, and further a problem that the terminal cannot resume a connection due to key asynchronization between the terminal and the source base station can be effectively resolved.

Step 706. The target base station sends a context request message to the source base station, and the source base station receives the context request message from the target base station.

The context request message includes the message authentication code generated by the terminal and the resume identifier, and the context request message is used to request to obtain the context of the terminal.

This step is the same as step 305. For details, refer to the foregoing description.

Step 707. The source base station obtains the context of the terminal if checking the message authentication code to be successful.

For a manner of checking the message authentication code by the source base station, refer to the manner of checking the message authentication code used by the source base station when the terminal generates the message authentication code in the manner 2 in step 306.

Step 708. The source base station sends a context response message to the target base station if checking the message authentication code to be successful.

The context response message may include the context of the terminal, for example, include the integrity protection algorithm of the source base station and the integrity protection key of the source base station. Optionally, the context response message further includes generated KgNB*.

Step 709. The target base station sends a connection resume response message to the terminal, and the terminal receives the connection resume response message from the target base station.

The connection resume response message is used to instruct the terminal to resume an RRC connection. Optionally, encryption and integrity protection may be respectively performed on the connection resume response message by using an encryption key and the integrity protection key that are generated by the target base station based on the integrity protection algorithm of the source base station and KgNB*. Details are not described herein.

After step 709, a subsequent procedure of entering the connected state by the terminal from the inactive state is further included. For details, refer to descriptions in related documents. Details are not described herein.

Figure 7:
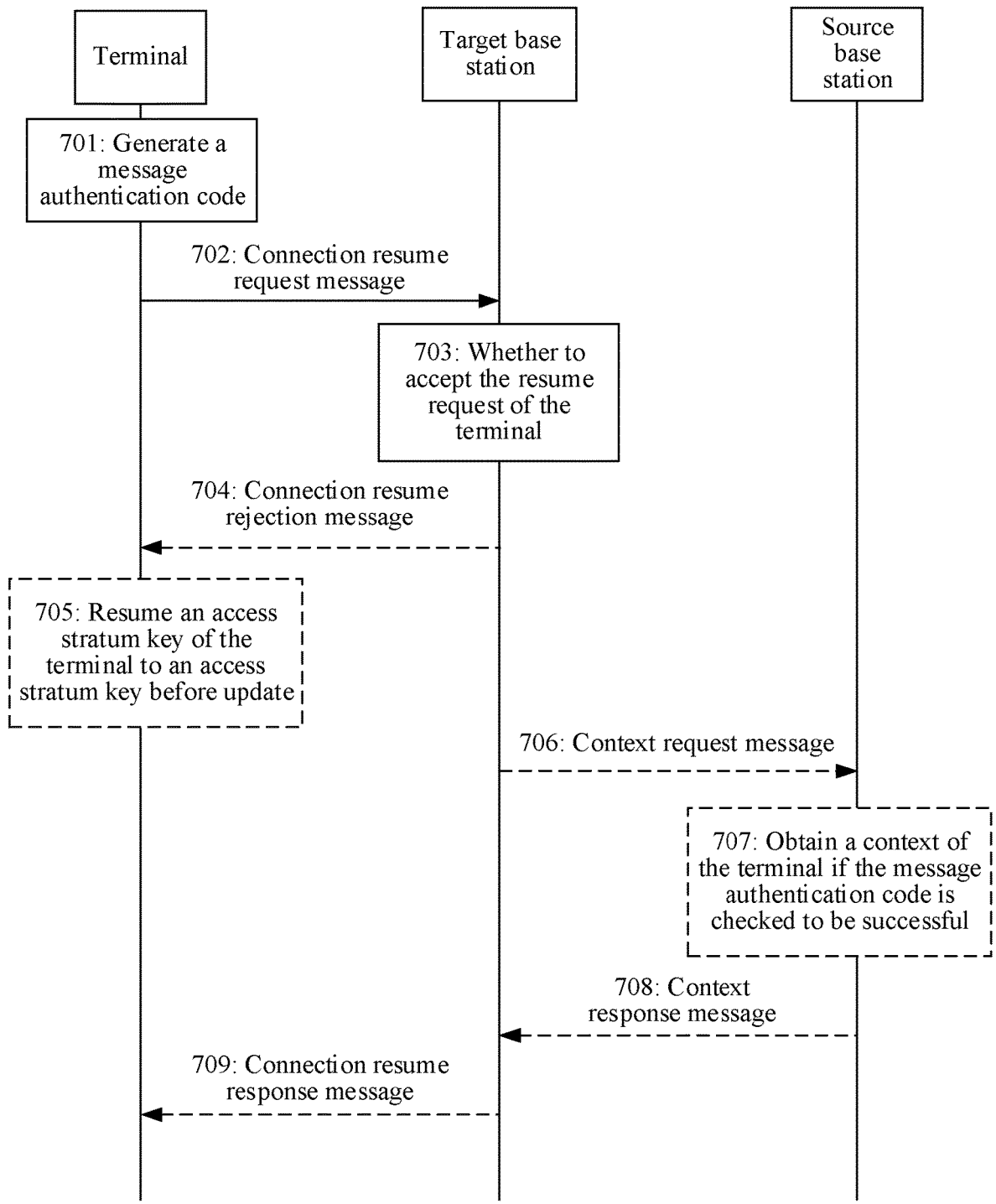
FIG. 7 is a flowchart of another connection resume request method according to this application.

The connection resume request method shown in step 701 to step 709 can effectively resolve a problem existing when the message authentication code is generated in the manner 2 in step 301. In the solution shown in FIG. 7, when the target base station determines to reject the connection resume request of the terminal, the target base station further sends the connection resume rejection message to the terminal in step 704, and the terminal resumes the access stratum key of the terminal to the access stratum key before the update in step 705. Therefore, key consistency is always maintained between the terminal and the source base station, and therefore a problem that the terminal cannot resume a connection due to key asynchronization between the terminal and the source base station can be effectively resolved.

It should be noted that the connection resume request message, the connection resume response message, the connection resume complete message, the context request message, the context response message, or the like in the foregoing embodiments is merely a name, and the name does not constitute a limitation on the message. In a 5G network and another future network, the connection resume request message, the connection resume response message, the connection resume complete message, the context request message, or the context response message may have another name. This is not specifically limited in the embodiments of this application. For example, the connection resume request message may further be replaced with a request message, a resume request message, a connection request message, or the like, the connection resume response message may further be replaced with a response message, a resume response message, a connection response message, or the like, the connection resume complete message may further be replaced with a complete message, a resume complete message, a connection complete message, or the like, the context request message may further be replaced with a request message or the like, and the context response message may further be replaced with a response message or the like.

The solutions provided in this application are described above mainly from a perspective of interaction between network elements. It may be understood that the network elements include corresponding hardware structures and/or software modules for performing the foregoing functions. A person of ordinary skill in the art should easily be aware that, in combination with the examples described in the embodiments disclosed in this specification, units and algorithms steps may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the present disclosure.

Figure 8:
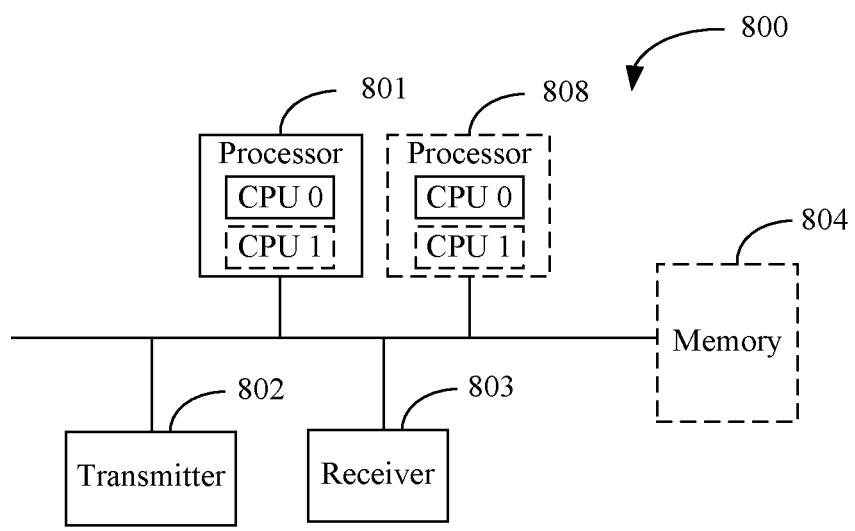
FIG. 8 is a schematic diagram of an apparatus according to this application.

Based on a similar concept, FIG. 8 is a schematic diagram of an apparatus according to this application. The apparatus may be a terminal, a target base station, or a source base station, and may perform the method performed by the terminal, the target base station, or the source base station in any one of the foregoing embodiments.

The apparatus 800 includes at least one processor 801, a transmitter 802, and a receiver 803, and optionally, further includes a memory 804. The processor 801, the transmitter 802, the receiver 803, and the memory 804 are connected by using a communications line.

The processor 801 may be a general central processing unit (CPU), a microprocessor, an application-specific integrated circuit (ASIC), or one or more integrated circuits configured to control execution of a program in the solutions of the present disclosure.

The communications line may include a path for transmitting information between the foregoing units.

The transmitter 802 and the receiver 803 are configured to communicate with another device or a communications network. The transmitter and the receiver include a radio frequency circuit.

The memory 804 may be a read-only memory (ROM) or another type of static storage device that can store static information and an instruction, a random access memory (RAM) or another type of dynamic storage device that can store information and an instruction, or may be an electrically erasable programmable read-only memory (EEPROM), a compact disc read-only memory (CD-ROM) or another compact disc storage, an optical disc storage (including a compressed optical disc, a laser disc, an optical disc, a digital versatile disc, a Blu-ray optical disc, and the like), a magnetic disk storage medium or another magnetic storage device, or any other medium that can be configured to carry or store expected program code in a form of an instruction or a data structure and that can be accessed by a computer, but is not limited thereto. The memory 804 may exist independently, and be connected to the processor 801 by using the communications line. Alternatively, the memory 804 may be integrated with the processor. The memory 804 is configured to store application program code for performing the solutions in the present disclosure, where the application program code is executed under control of the processor 801. The processor 801 is configured to execute the application program code stored in the memory 804.

During implementation, in an embodiment, the processor 801 may include one or more CPUs, for example, a CPU 0 and a CPU 1 in FIG. 8.

During implementation, in an embodiment, the apparatus 800 may include a plurality of processors, for example, the processor 801 and a processor 808 in FIG. 8. Each of the processors may be a single-core (single-CPU) processor, or may be a multi-core (multi-CPU) processor. Herein, the processor may be one or more devices, circuits, and/or processing cores for processing data (for example, a computer instruction).

Figure 6:
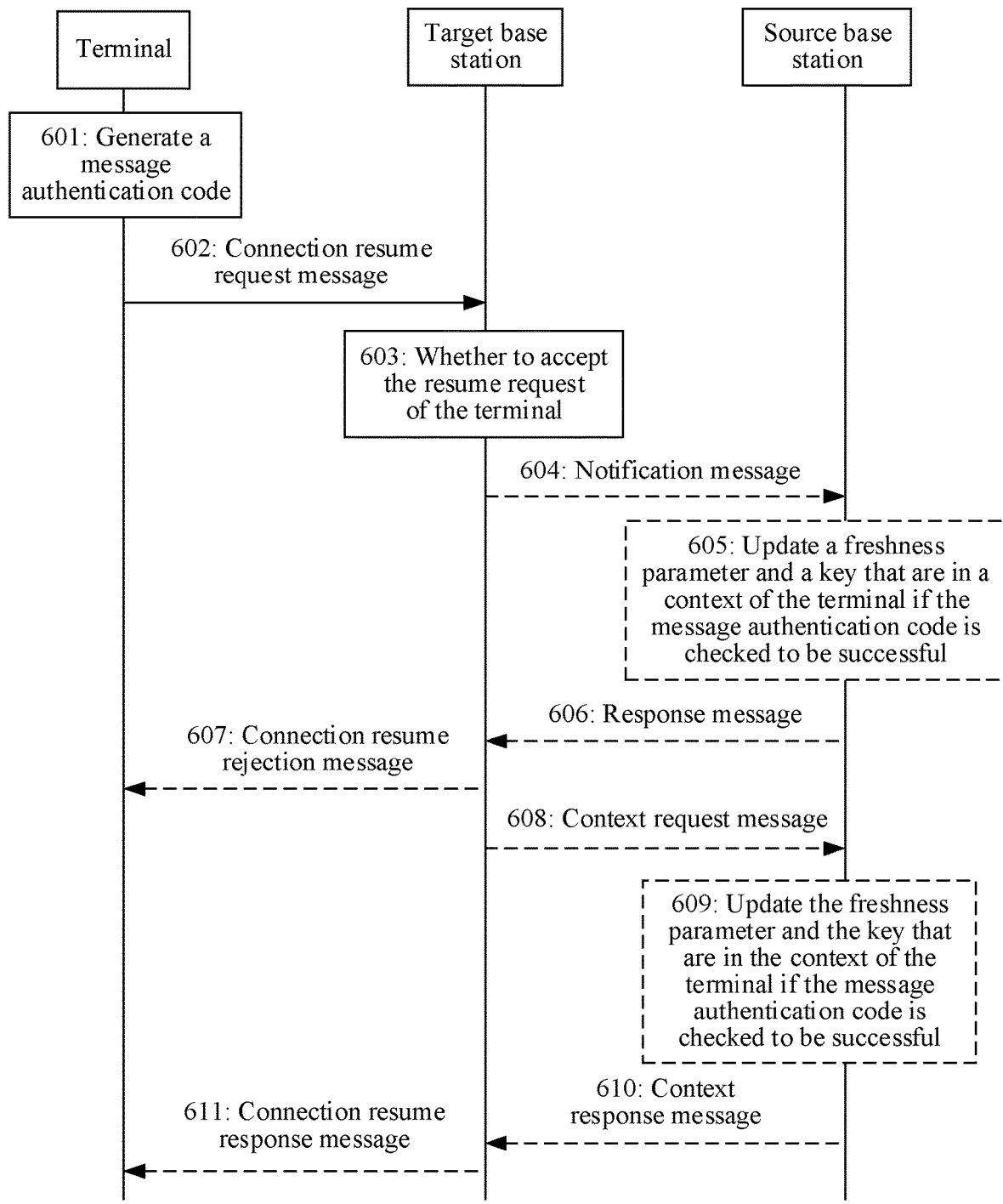
FIG. 6 is a flowchart of another connection resume request method according to this application.

It should be understood that when the apparatus 800 is a terminal, the apparatus 800 may be configured to implement steps performed by the terminal in the methods in the embodiments of the present disclosure. For example, the apparatus 800 may perform step 301, step 302, step 304, and step 308 in FIG. 3, may further perform step 401, step 402, step 407, and step 411 in FIG. 4, may further perform step 501, step 502, step 507, and step 511 in FIG. 5, may further perform step 601, step 602, step 607, and step 611 in FIG. 6, and may further perform step 701, step 702, step 704, and step 709 in FIG. 7. For related features, refer to the foregoing description. Details are not described herein again.

When the apparatus 800 is a target base station, the apparatus 800 may be configured to implement steps performed by the target base station in the methods in the embodiments of the present disclosure. For example, the apparatus 800 may perform step 302, step 303, step 304, step 305, step 307, and step 308 in FIG. 3, may further perform step 402, step 403, step 404, step 406, step 407, step 408, step 410, and step 411 in FIG. 4, may further perform step 502, step 503, step 504, step 506, step 507, step 508, step 510, and step 511 in FIG. 5, may further perform step 602, step 603, step 604, step 606, step 607, step 608, step 610, and step 611 in FIG. 6, and may further perform step 702, step 703, step 704, step 706, step 708, and step 709 in FIG. 7. For related features, refer to the foregoing description. Details are not described herein again.

When the apparatus 800 is a source base station, the apparatus 800 may be configured to implement steps performed by the source base station in the methods in the embodiments of the present disclosure. For example, the apparatus 800 may perform step 305, step 306, and step 307 in FIG. 3, may further perform step 404, step 405, step 406, step 408, step 409, and step 410 in FIG. 4, may further perform step 504, step 505, step 506, step 508, step 509, and step 510 in FIG. 5, may further perform step 604, step 605, step 606, step 608, step 609, and step 610 in FIG. 6, and may further perform step 706, step 707, and step 708 in FIG. 7. For related features, refer to the foregoing description. Details are not described herein again.

Figure 9:
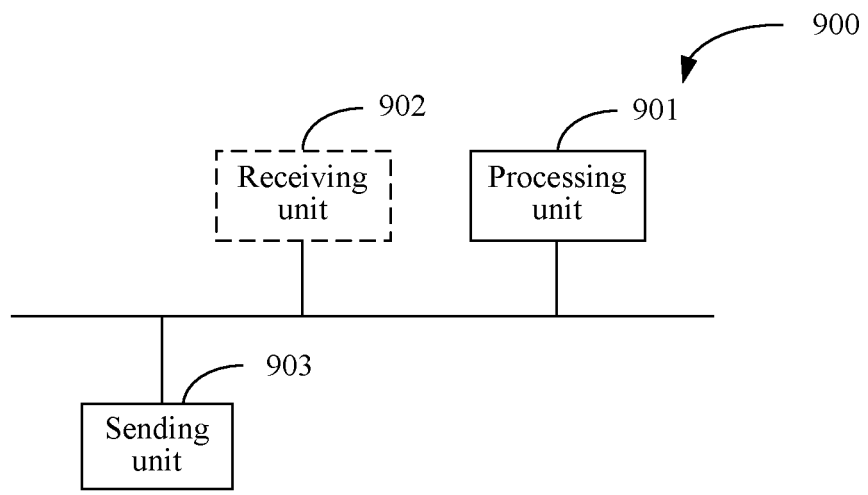
FIG. 9 is a schematic diagram of another apparatus according to this application.

In this application, function modules may be obtained through division in the terminal based on the foregoing method example. For example, function modules may be obtained through division in correspondence with functions, or two or more functions may be integrated into one processing module. The integrated module may be implemented in a form of hardware, or may be implemented in a form of a software function module. It should be noted that, in this application, module division is an example, and is merely logical function division. During implementation, another division manner may be used. For example, when function modules are obtained through division in correspondence with functions, FIG. 9 is a schematic diagram of an apparatus. The apparatus 900 may be the terminal in the foregoing embodiments. The apparatus 900 includes a processing unit 901 and a sending unit 903. Optionally, a receiving unit 902 is further included.

During implementation of a connection resume request method, the processing unit 901 is configured to generate a message authentication code based on a freshness parameter and an integrity protection key that is of the apparatus, where freshness parameters used to generate message authentication codes at two consecutive times are different; and the sending unit 903 is configured to send a connection resume request message to a target base station, where the connection resume request message includes the message authentication code, and the connection resume request message is used to request to resume a radio resource control RRC connection.

In a possible implementation, the freshness parameter includes a quantity of rejection times, and the quantity of rejection times is used to indicate a quantity of times for which resuming of the RRC connection that the apparatus attempts to perform is rejected.

In a possible implementation, the receiving unit 902 is configured to receive a connection resume response message from the target base station, where the connection resume response message is used to instruct the terminal to resume the RRC connection.

In a possible implementation, the connection resume request message further includes an indication parameter, and the indication parameter is used to indicate the freshness parameter.

In a possible implementation, the freshness parameter includes a PDCP count, and the indication parameter includes some or all bits of the PDCP count.

It should be understood that the terminal may be configured to implement the steps performed by the terminal in the methods in the embodiments of the present disclosure. For related features, refer to the foregoing description. Details are not described herein again.

Figure 10:
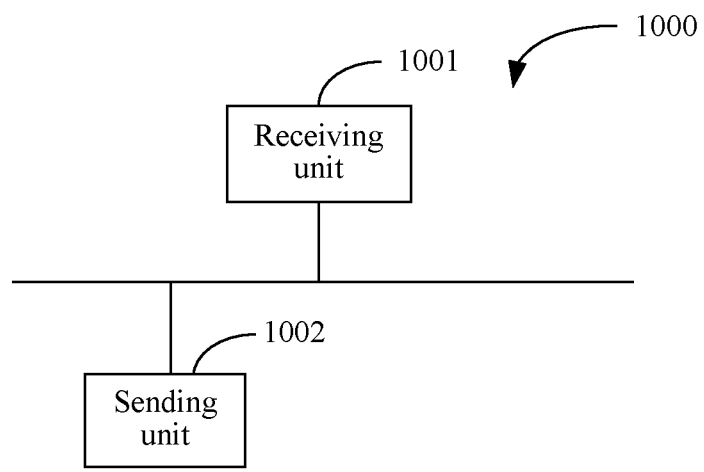
FIG. 10 is a schematic diagram of another apparatus according to this application.

In this application, function modules may be obtained through division in the target base station based on the foregoing method examples. For example, the function modules may be obtained through division in correspondence with functions, or two or more functions may be integrated into one processing module. The integrated module may be implemented in a form of hardware, or may be implemented in a form of a software function module. It should be noted that, in this application, module division is an example, and is merely logical function division. During implementation, another division manner may be used. For example, when function modules are obtained through division in correspondence with functions, FIG. 10 is a schematic diagram of an apparatus. The apparatus 1000 may be the target base station in the foregoing embodiments. The apparatus 1000 includes a receiving unit 1001 and a sending unit 1002.

During implementation of a connection resume request method, the receiving unit 1001 is configured to receive a connection resume request message from a terminal, where the connection resume request message includes a message authentication code, the connection resume request message is used to request to resume a radio resource control RRC connection, and the message authentication code is generated based on an integrity protection key of the terminal; and the sending unit 1002 is configured to send a notification message to a source base station if resuming of the RRC connection is rejected, where the notification message includes the message authentication code.

The notification message has one or more of the following functions, the notification message is used to instruct to update a context of the terminal in the source base station; the notification message is used to notify that the target base station rejects resuming of a connection that is performed by the terminal; the notification message is used to instruct to update a freshness parameter in the context of the terminal in the source base station; and the notification message is used to instruct to update a key in the context of the terminal in the source base station.

In a possible implementation, the context of the terminal that the notification message instructs to update includes an access stratum key.

In a possible implementation, the message authentication code is generated based on the freshness parameter and an integrity protection key of the terminal, and the context of the terminal that the notification message instructs to update includes the freshness parameter, where freshness parameters used to generate message authentication codes at two consecutive times are different.

In a possible implementation, the connection resume request message further includes an indication parameter, the indication parameter is used to indicate the freshness parameter, and the notification message further includes the indication parameter.

In a possible implementation, the freshness parameter includes a PDCP count, and the indication parameter includes some or all bits of the PDCP count.

In a possible implementation, the freshness parameter includes a quantity of rejection times, and the quantity of rejection times is used to indicate a quantity of times for which resuming of the RRC connection that the apparatus attempts to perform is rejected.

During implementation of another connection resume request method, the receiving unit 1001 is configured to receive a connection resume request message from a terminal, where the connection resume request message includes a message authentication code; the message authentication code is generated based on a freshness parameter and an integrity protection key that is of the terminal, where freshness parameters used to generate message authentication codes at two consecutive times are different; and the connection resume request message is used to request to resume a radio resource control RRC connection; and the sending unit 1002 is configured to send a context request message to a source base station if the RRC connection is resumed, where the context request message includes the message authentication code, and the context request message is used to request to obtain a context of the terminal.

In a possible implementation, the connection resume request message further includes an indication parameter, the indication parameter is used to indicate the freshness parameter, and the context request message further includes the indication parameter.

In a possible implementation, the freshness parameter includes a PDCP count, and the indication parameter includes some or all bits of the PDCP count.

In a possible implementation, the freshness parameter includes a quantity of rejection times, and the quantity of rejection times is used to indicate a quantity of times for which resuming of the RRC connection that the apparatus attempts to perform is rejected.

It should be understood that the target base station may be configured to implement the steps performed by the target base station in the method in the embodiments of the present disclosure. For related features, refer to the foregoing description. Details are not described herein again.

Figure 11:
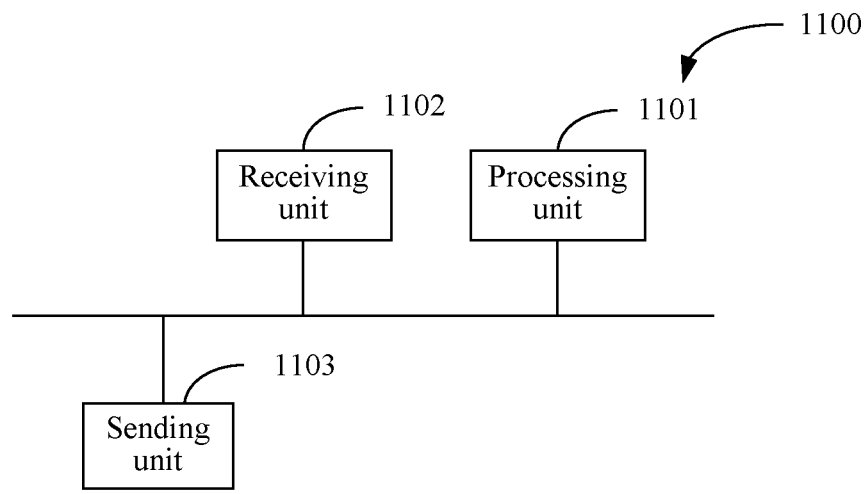
FIG. 11 is a schematic diagram of another apparatus according to this application.

In this application, function modules may be obtained through division in the source base station based on the foregoing method examples. For example, the function modules may be obtained through division in correspondence with functions, or two or more functions may be integrated into one processing module. The integrated module may be implemented in a form of hardware, or may be implemented in a form of a software function module. It should be noted that, in this application, module division is an example, and is merely logical function division. During implementation, another division manner may be used. For example, when function modules are obtained through division in correspondence with functions, FIG. 11 is a schematic diagram of an apparatus. The apparatus 1100 may be the source base station in the foregoing embodiments. The apparatus 1100 includes a processing unit 1101, a receiving unit 1102, and a sending unit 1103.

During implementation of a connection resume request method, the receiving unit 1102 is configured to receive a notification message from a target base station, where the notification message includes a message authentication code, and the message authentication code is generated based on an integrity protection key of a terminal; and the processing unit 1101 is configured to check the message authentication code based on an integrity protection key of the source base station, and is configured to update a context of the terminal in the source base station if checking the message authentication code to be successful.

The notification message has one or more of the following functions, the notification message is used to instruct to update a context of the terminal in the source base station; the notification message is used to notify that the target base station rejects resuming of a connection that is performed by the terminal; the notification message is used to instruct to update a freshness parameter in the context of the terminal in the source base station; and the notification message is used to instruct to update a key in the context of the terminal in the source base station.

In a possible implementation, the processing unit 1101 is configured to update an access stratum key in the context of the terminal in the source base station.

In a possible implementation, the message authentication code is generated based on a freshness parameter and an integrity protection key that is of the terminal, where freshness parameters used to generate message authentication codes at two consecutive times are different; and the processing unit 1101 is configured to check the message authentication code based on the freshness parameter and an integrity protection key that is of the source base station.

In a possible implementation, the notification message further includes an indication parameter, and the indication parameter is used to indicate the freshness parameter.

In a possible implementation, the freshness parameter includes a PDCP count. That the processing unit 1101 is configured to update the context of the terminal in the source base station includes updating, if a value of the PDCP count is greater than a value of a PDCP count in the context of the terminal, the value of the PDCP count in the context of the terminal to the value of the PDCP count indicated by the indication parameter.

In a possible implementation, the freshness parameter includes a quantity of rejection times, and the quantity of rejection times is used to indicate a quantity of times for which resuming of the RRC connection that the apparatus attempts to perform is rejected.

In a possible implementation, the processing unit 1101 is configured to increase the quantity of rejection times in the context of the terminal by 1.

During implementation of another connection resume request method, the receiving unit 1102 is configured to receive a context request message from a target base station, where the context request message includes a message authentication code; the message authentication code is generated based on a freshness parameter and an integrity protection key that is of a terminal, where freshness parameters used to generate message authentication codes at two consecutive times are different; and the context request message is used to request to obtain a context of the terminal; the processing unit 1101 is configured to check the message authentication code based on the freshness parameter and the integrity protection key that is of the source base station, and is configured to update the freshness parameter in the context of the terminal if checking the message authentication code to be successful; and the sending unit 1103 is configured to send a context response message to the target base station, where the context response message includes the context of the terminal.

In a possible implementation, the context request message further includes an indication parameter, the indication parameter is used to indicate the freshness parameter, and the freshness parameter includes a PDCP count. That the processing unit 1101 updates the context of the terminal in the source base station includes updating, if a value of the PDCP count is greater than a value of a PDCP count in the context of the terminal, the value of the PDCP count in the context of the terminal to the value of the PDCP count indicated by the indication parameter.

In a possible implementation, the indication parameter includes some bits of the PDCP count. The processing unit 1101 is further configured to determine, based on the indication parameter, the PDCP count indicated by the indication parameter.

In a possible implementation, the freshness parameter includes a quantity of rejection times, and the quantity of rejection times is used to indicate a quantity of times for which resuming of the RRC connection that the apparatus attempts to perform is rejected. That the processing unit 1101 is configured to update the context of the terminal in the source base station includes resetting the quantity of rejection times in the context of the terminal to zero.

It should be understood that the source base station may be configured to implement the steps performed by the source base station in the methods in the embodiments of the present disclosure. For related features, refer to the foregoing description. Details are not described herein again.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer instructions are loaded and executed on a computer, the procedure or functions according to the embodiments of the present disclosure are all or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer instructions are loaded and executed on a computer, the procedure or functions according to the embodiments of the present disclosure are all or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

Although the present disclosure is described with reference to the embodiments, in a process of implementing the present disclosure that claims protection, a person skilled in the art may understand and implement another variation of the disclosed embodiments by viewing the accompanying drawings, disclosed content, and the accompanying claims. In the claims, "comprising" does not exclude another component or another step, and "a" or "one" does not exclude a meaning of plurality. A single processor or another unit may implement several functions enumerated in the claims. Some measures are recorded in dependent claims that are different from each other, but this does not mean that these measures cannot be combined to produce a better effect.

A person skilled in the art should understand that the embodiments of this application may be provided as a method, an apparatus, a computer-readable storage medium, or a computer program product. Therefore, this application may use a form of hardware only embodiments, software only embodiments, or embodiments with a combination of software and hardware. They are collectively referred to as "modules" or "systems".

A person skilled in the art may further understand that various illustrative logical blocks and steps that are listed in the embodiments of this application may be implemented by using electronic hardware, computer software, or a combination thereof. Whether the functions are implemented by using hardware or software depends on particular applications and a design requirement of the entire system. A person skilled in the art may use various methods to implement the described functions for each particular application, but it should not be considered that the implementation goes beyond the scope of the embodiments of this application.

Although the present disclosure is described with reference to specific features and the embodiments thereof, various modifications and combinations may be made to them without departing from the scope of the present disclosure. Correspondingly, the specification and the accompanying drawings are merely examples for description of the present disclosure defined by the appended claims, and are considered as any of or all modifications, variations, combinations or equivalents that cover the scope of the present disclosure. A person skilled in the art can make various modifications and variations to the present disclosure without departing from the spirit and scope of the present disclosure. The present disclosure is intended to cover these modifications and variations provided that they fall within the scope of the claims of the present disclosure and their equivalent technologies.

What is claimed is:

1. A connection resume method, comprising:
   receiving, by an apparatus, a radio resource control (RRC) connection release message from a source base station, wherein the RRC connection release message comprises an indication;
   entering, by the apparatus, an inactive state according to the indication;
   deriving, by the apparatus, a new access stratum key different from a first access stratum key, wherein the first access stratum key is used, before the apparatus enters the inactive state, by the apparatus and the source base station;
   sending, by the apparatus to a target base station after determining to resume an RRC connection established with the source base station, a connection resume request for resuming from the inactive state to a connected state in the target base station;
   receiving, by the apparatus, a connection resume rejection message from the target base station, wherein the connection resume rejection message indicates that the connection resume request is rejected; and
   deleting, by the apparatus in response to the connection resume rejection message, the new access stratum key and keeping the first access stratum key as a current access stratum key.

2. The connection resume method of claim 1, further comprising generating, by the apparatus, a message authentication code based on an integrity protection key and an integrity protection algorithm, wherein the integrity protection key and the integrity protection algorithm are used by the apparatus and the source base station before the apparatus enters the inactive state, and wherein the connection resume request message further comprises the message authentication code.

3. The connection resume method of claim 1, further comprising:
   deriving, by the apparatus, a new integrity protection key using the new access stratum key; and
   generating, by the apparatus, a message authentication code based on the new integrity protection key and an integrity protection algorithm, wherein the integrity protection algorithm is for use by the apparatus and the source base station before the apparatus enters the inactive state, and wherein the connection resume request message further comprises the message authentication code.

4. The connection resume method of claim 1, wherein deriving the new access stratum key comprises deriving, by the apparatus, the new access stratum key based on the first access stratum key and a target physical cell identifier (PCI).

5. The connection resume method of claim 1, wherein keeping the first access stratum key comprises keeping, by the apparatus, the first access stratum key in a current access stratus security context.

6. The connection resume method of claim 1, wherein the RRC connection release message further comprises a next hop chaining counter (NCC), and wherein deriving the new access stratum key comprises deriving, by the apparatus, the new access stratum key based on the NCC and a target physical cell identifier (PCI).

7. The connection resume method of claim 1, wherein the new access stratum key is KgNB*, and wherein the first access stratum key is KgNB.

8. The connection resume method of claim 1, wherein the connection resume request is rejected due to heavy load of the target base station.

9. The connection resume method of claim 1, wherein receiving the connection resume rejection message from the target base station comprises receiving the connection resume rejection message from the target base station when the target base station has heavy load.

10. The connection resume method of claim 1, wherein keeping the first access stratum key as the current access stratum key comprises using, by the apparatus, a security context before an update as a current or stored security context, and wherein the security context before the update includes the first access stratum key.

11. The connection resume method of claim 1, wherein the source base station and the target base station are a same base station.

12. An apparatus, comprising:
   a processor coupled to a memory storing instructions, which when executed by the processor, cause the apparatus to:
      receive a radio resource control (RRC) connection release message from a source base station, wherein the RRC connection release message comprises an indication;
      enter an inactive state according to the indication;
      derive a new access stratum key different from a first access stratum key, wherein the first access stratum key is used, before the apparatus enters the inactive state, by the apparatus and the source base station;

send, to a target base station after determining to resume an RRC connection established with the source base station, a connection resume request for resuming from the inactive state to a connected state in the target base station;

receive a connection resume rejection message from the target base station, wherein the connection resume rejection message indicates that the connection resume request is rejected; and delete, in response to the connection resume rejection message, the new access stratum key and keep the first access stratum key as a current access stratum key.

13. The apparatus of claim 12, wherein the instructions further cause the apparatus to generate a message authentication code based on an integrity protection key and an integrity protection algorithm, wherein the integrity protection key and the integrity protection algorithm are used by the apparatus and the source base station before the apparatus enters the inactive state, and wherein the connection resume message further comprises the message authentication code.

14. The apparatus of claim 12, wherein the instructions further cause the apparatus to derive a new integrity protection key using the new access stratum key; and generate a message authentication code based on the new integrity protection key and an integrity protection algorithm, wherein the integrity protection algorithm is used by the apparatus and the source base station before the apparatus enters the inactive state, and wherein the connection resume message further comprises the message authentication code.

15. The apparatus of claim 12, wherein the new access stratum key is derived based on the first access stratum key and a target physical cell identifier (PCI).

16. The apparatus of claim 12, wherein the apparatus keeps the first access stratum key in a current access status security context.

17. The apparatus of claim 12, wherein the RRC connection release message further comprises a next hop chaining counter (NCC), and wherein the new access stratum key is derived based on the NCC and a target physical cell identifier (PCI).

18. The apparatus of claim 12, wherein the new access stratum key is KgNB*, and wherein the first access stratum key is KgNB.

19. The apparatus of claim 12, wherein the apparatus is a terminal device or a chip in the terminal device.

20. The apparatus of claim 12, wherein the connection resume request is rejected due to heavy load of the target base station.

21. The apparatus of claim 12, wherein the instructions further cause the apparatus to receive the connection resume rejection message from the target base station when the target base station has heavy load.

22. The apparatus of claim 12, wherein the instructions further cause the apparatus to use a security context before an update as a current or stored security context, and wherein the security context before the update includes the first access stratum key.

23. The apparatus of claim 12, wherein the source base station and the target base station are a same base station.

24. A non-transitory computer readable storage medium storing instructions which, when executed by a processor of an apparatus, cause the apparatus to:

receive a radio resource control (RRC) connection release message from a source base station, wherein the RRC connection release message comprises an indication;

enter an inactive state according to the indication;

derive a new access stratum key different from a first access stratum key, wherein the first access stratum key is used, before the apparatus enters an inactive state, by the apparatus and the source base station;

send, to a target base station after determining to resume an RRC connection established with the source base station, a connection resume request for resuming from the inactive state to a connected state in the target base station;

receive a connection resume rejection message from the target base station, wherein the connection resume rejection message indicates that the connection resume request is rejected; and in response to the connection resume rejection message, delete the new access stratum key and keep the first access stratum key as a current access stratum key.

* * * * *